(12) United States Patent
Mahasseni et al.

(10) Patent No.: US 11,710,072 B1
(45) Date of Patent: Jul. 25, 2023

(54) INVERSE REINFORCEMENT LEARNING FOR USER-SPECIFIC BEHAVIORS

(71) Applicant: Apple Inc., Cupertino, CA (US)

(72) Inventors: Behrooz Mahasseni, San Jose, CA (US); Mark Drummond, Palo Alto, CA (US)

( * ) Notice: Subject to any disclaimer, the term of this patent is extended or adjusted under 35 U.S.C. 154(b) by 0 days.

(21) Appl. No.: 17/360,898

(22) Filed: Jun. 28, 2021

Related U.S. Application Data

(60) Provisional application No. 63/070,601, filed on Aug. 26, 2020.

(51) Int. Cl.
| | |
|---|---|
| *G06T 19/00* | (2011.01) |
| *G06N 20/00* | (2019.01) |
| *G06T 13/40* | (2011.01) |
| *G06N 3/08* | (2023.01) |
| *G06F 3/16* | (2006.01) |

(52) U.S. Cl.
CPC .............. *G06N 20/00* (2019.01); *G06N 3/08* (2013.01); *G06T 13/40* (2013.01); *G06T 19/006* (2013.01); *G06F 3/167* (2013.01); *G06T 2200/24* (2013.01)

(58) Field of Classification Search
None
See application file for complete search history.

(56) References Cited

PUBLICATIONS

Tastan et al., "Learning to Intercept Opponents in First Person Shooter Games", 2012. (Year: 2012).*

Joel Lehman et al., "Safe Mutations for Deep and Recurrent Neural Networks through Output Gradients," GECCO, Jul. 2018, pp. 1-11.
Xingwen Zhang et al., "On the Relationship Between the OpenAI Evolution Strategy and Stochastic Gradient Descent," arXiv preprint arXiv:1712.06564, Dec. 2017, pp. 1-13.
Felipe Petroski Such et al., "Deep Neuroevolution: Genetic Algorithms are a Competitive Alternative for Training Deep Neural Networks for Reinforcement Learning," arXiv preprint arXiv:1712.06567, Dec. 2017, pp. 1-16.
Krzysztof Choromanski et al., "Provably Robust Blackbox Optimization for Reinforcement Learning," Conference on Robot Learning, PMLR, May 2020, pp. 683-696.

(Continued)

*Primary Examiner* — Nicholas R Wilson
(74) *Attorney, Agent, or Firm* — Fernando & Partners, LLP

(57) ABSTRACT

In one implementation, a method for inverse reinforcement learning for tailoring virtual agent behaviors to a specific user. The method includes: obtaining an initial behavior model for a virtual agent and an initial state for a virtual environment associated with the virtual agent, wherein the initial behavior model includes one or more tunable parameters; generating, based on the initial behavior model and the initial state for the virtual environment, a first set of behavioral trajectories for the virtual agent; obtaining a second set of behavioral trajectories from a source different from the initial behavior model; and generating an updated behavior model by adjusting at least one of the one or more tunable parameters of the initial behavior model as a function of the first and second sets of behavioral trajectories, wherein at least one of the first and second sets of behavioral trajectories are assigned different weights.

25 Claims, 12 Drawing Sheets

(56) References Cited

PUBLICATIONS

Agoston E. Eiben et al., "What is an evolutionary algorithm?," In Introduction to Evolutionary Computing, Springer, Berlin, Heidelberg, 2015, pp. 15-35.
Hans-Georg Beyer et al., "Evolution strategies: A comprehensive introduction," Natural Computing, vol. 1, 2002, pp. 3-52.
Chelsea Finn et al., "Guided Cost Learning: Deep Inverse Optimal Control via Policy Optimization," International conference on machine learning, PMLR, 2016, pp. 1-13.
Kenneth O. Stanley, "Welcoming the Era of Deep Neuroevolution," Uber Engineering, Dec. 2017, Retrieved from the Internet: https://eng.uber.com/deep-neuroevolution/, pp. 1-12.
Lars Hulstaert, "Gradient descent vs. neuroevolution," towards data science, Dec. 2017, Retrieved from the Internet: https://towardsdatascience.com/gradient-descent-vs-neuroevolution-f907dace010f, pp. 1-18.
"How the Genetic Algorithm Works," MathWorks, Retrieved from the Internet Jun. 28, 2021: https://www.mathworks.com/help/gads/how-the-genetic-algorithm-works.html, pp. 1-8.
Vishal Bidawatka, "Google football environment—installation and Training RL agent using A3C," towards data science, Jul. 2019, Retrieved from the Internet: https://towardsdatascience.com/google-football-environment-installation-and-training-rl-agent-using-a3c-d058a44f0fad, pp. 1-15.
Brainxyz, "Genetic Algorithm vs. Stochastic Gradient Descent," Sep. 2020, Retrieved from the Internet: https://www.brainxyz.com/machine-learning/genetic-algorthim/, pp. 1-14.
Laszlo Fazekas, "How Genetic Algorithms Can Compete with Gradient Descent and Backprop," Mar. 2021, Retrieved from the Internet: https://hackernoon.com/how-genetic-algorithms-can-compete-with-gradient-descent-and-backprop-9m9t33bq, pp. 1-14.

\* cited by examiner

700

- 7-1: At a virtual agent operating system including one or more processors and non-transitory memory:

Obtain an initial behavior model for a virtual agent and an initial state for a virtual environment associated with the virtual agent, wherein the initial behavior model includes one or more tunable parameters

- 7-2: Generate, based on the initial behavior model and the initial state for the virtual environment, a first set of behavioral trajectories for the virtual agent

- 7-3: Obtain a second set of behavioral trajectories from a source different from the initial behavior mode

- 7-3a: The source corresponds to user inputs driving the virtual agent within the virtual environment

- 7-3b: The source corresponds to user feedback relative to randomized behaviors of the virtual agent within the virtual environment

- 7-3c: The source corresponds to pre-existing media content

- 7-4: Normalize the second set of behavioral trajectories based one of a format or modality of the first set of behavioral trajectories

- 7-5: Generate an updated behavior model by adjusting at least one of the one or more tunable parameters of the initial behavior model as a function of the first and second sets of behavioral trajectories, wherein at least one of the first and second sets of behavioral trajectories are assigned different weights

Figure 7

INVERSE REINFORCEMENT LEARNING FOR USER-SPECIFIC BEHAVIORS

CROSS-REFERENCE TO RELATED APPLICATIONS

This application claims the benefit of U.S. Provisional Patent App. No. 63/070,601, filed on Aug. 26, 2020, which is incorporated by reference in its entirety.

TECHNICAL FIELD

The present disclosure generally relates to tailoring virtual agent (VA) behaviors for a specific user and, in particular, to systems, methods, and methods for inverse reinforcement learning (IRL) for tailoring virtual agent behaviors to a specific user.

BACKGROUND

In some instances, a pre-authored behavior model (e.g., a probabilistic behavior tree (PBT), decision tree, decision matrix, look-up table, or the like) may use machine learning or reinforcement learning techniques to incorporate user preferences. However, tailoring the pre-authored behavior model to user preferences is a challenge without a significant corpus of example behavioral trajectories including associated user feedback.

BRIEF DESCRIPTION OF THE DRAWINGS

So that the present disclosure can be understood by those of ordinary skill in the art, a more detailed description may be had by reference to aspects of some illustrative implementations, some of which are shown in the accompanying drawings.

FIG. 7 is a flowchart representation of a method of IRL for tailoring virtual agent behaviors to a specific user in accordance with some implementations.

Figure 1:
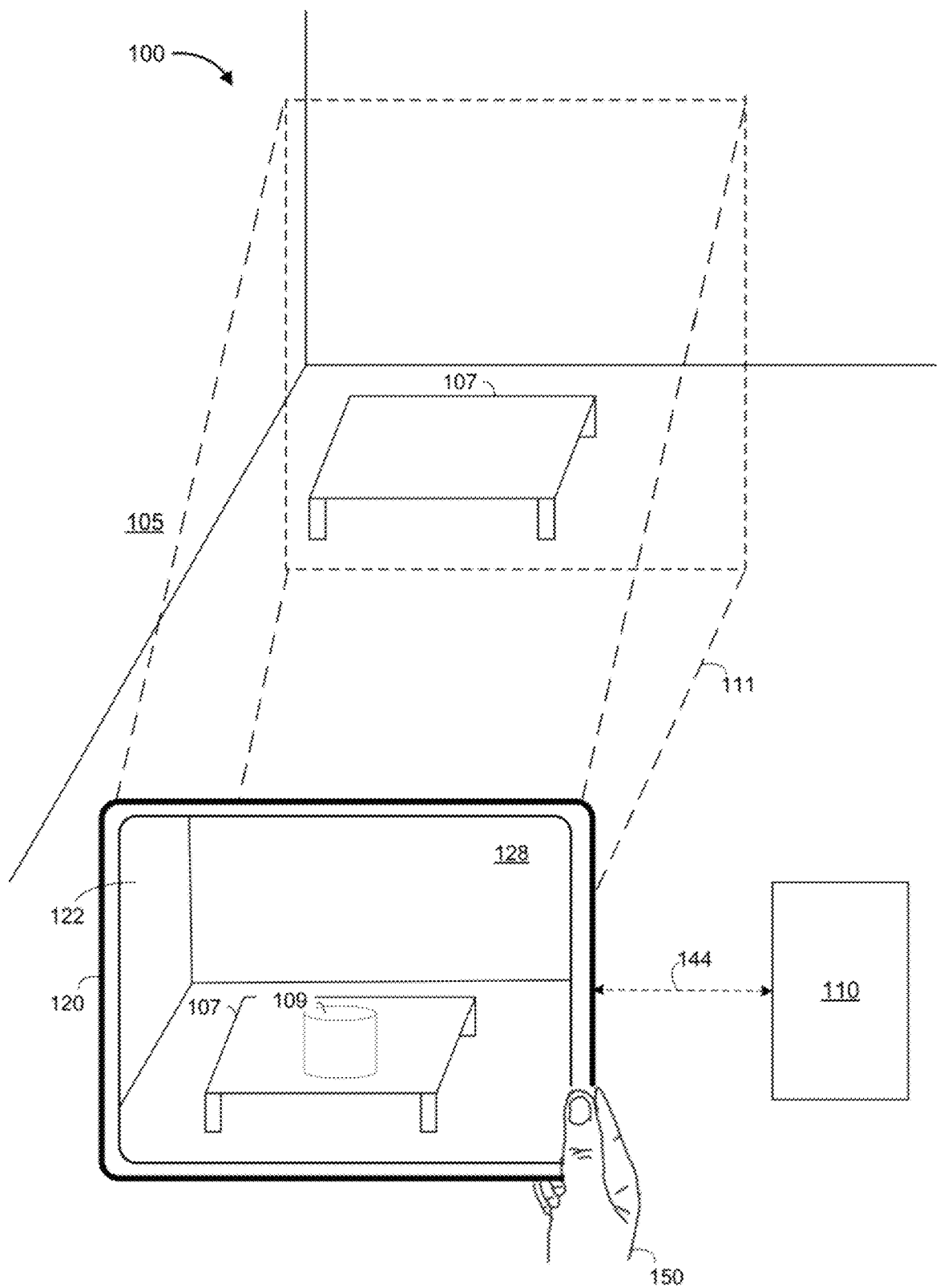
FIG. 1 is a block diagram of an example operating architecture in accordance with some implementations.

In accordance with common practice the various features illustrated in the drawings may not be drawn to scale. Accordingly, the dimensions of the various features may be arbitrarily expanded or reduced for clarity. In addition, some of the drawings may not depict all of the components of a given system, method, or device. Finally, like reference numerals may be used to denote like features throughout the specification and figures.

SUMMARY

Various implementations disclosed herein include devices, systems, and methods of IRL for tailoring virtual agent behaviors to a specific user. According to some implementations, the method is performed at a virtual agent operating system including one or more processors and non-transitory memory. In some implementations, the virtual agent operating system is communicatively coupled to a display device and one or more input devices. The method includes: obtaining an initial behavior model for a virtual agent and an initial state for a virtual environment associated with the virtual agent, wherein the initial behavior model includes one or more tunable parameters; generating, based on the initial behavior model and the initial state for the virtual environment, a first set of behavioral trajectories for the virtual agent; obtaining a second set of behavioral trajectories from a source different from the initial behavior model; and generating an updated behavior model by adjusting at least one of the one or more tunable parameters of the initial behavior model as a function of the first and second sets of behavioral trajectories, wherein at least one of the first and second sets of behavioral trajectories are assigned different weights.

In accordance with some implementations, an electronic device includes one or more displays, one or more processors, a non-transitory memory, and one or more programs; the one or more programs are stored in the non-transitory memory and configured to be executed by the one or more processors and the one or more programs include instructions for performing or causing performance of any of the methods described herein. In accordance with some implementations, a non-transitory computer readable storage medium has stored therein instructions, which, when executed by one or more processors of a device, cause the device to perform or cause performance of any of the methods described herein. In accordance with some implementations, a device includes: one or more displays, one or more processors, a non-transitory memory, and means for performing or causing performance of any of the methods described herein.

In accordance with some implementations, a computing system includes one or more processors, non-transitory memory, an interface for communicating with a display device and one or more input devices, and one or more programs; the one or more programs are stored in the non-transitory memory and configured to be executed by the one or more processors and the one or more programs include instructions for performing or causing performance of the operations of any of the methods described herein. In accordance with some implementations, a non-transitory computer readable storage medium has stored therein instructions which when executed by one or more processors of a computing system with an interface for communicating with a display device and one or more input devices, cause the computing system to perform or cause performance of the operations of any of the methods described herein. In accordance with some implementations, a computing system includes one or more processors, non-transitory memory, an interface for communicating with a display device and one or more input devices, and means for performing or causing performance of the operations of any of the methods described herein.

DESCRIPTION

Numerous details are described in order to provide a thorough understanding of the example implementations shown in the drawings. However, the drawings merely show some example aspects of the present disclosure and are therefore not to be considered limiting. Those of ordinary skill in the art will appreciate that other effective aspects and/or variants do not include all of the specific details described herein. Moreover, well-known systems, methods, components, devices, and circuits have not been described in exhaustive detail so as not to obscure more pertinent aspects of the example implementations described herein.

A physical environment refers to a physical world that people can sense and/or interact with without aid of electronic devices. The physical environment may include physical features such as a physical surface or a physical object. For example, the physical environment corresponds to a physical park that includes physical trees, physical buildings, and physical people. People can directly sense and/or interact with the physical environment such as through sight, touch, hearing, taste, and smell. In contrast, an extended reality (XR) environment refers to a wholly or partially simulated environment that people sense and/or interact with via an electronic device. For example, the XR environment may include augmented reality (AR) content, mixed reality (MR) content, virtual reality (VR) content, and/or the like. With an XR system, a subset of a person's physical motions, or representations thereof, are tracked, and, in response, one or more characteristics of one or more virtual objects simulated in the XR environment are adjusted in a manner that comports with at least one law of physics. As one example, the XR system may detect head movement and, in response, adjust graphical content and an acoustic field presented to the person in a manner similar to how such views and sounds would change in a physical environment. As another example, the XR system may detect movement of the electronic device presenting the XR environment (e.g., a mobile phone, a tablet, a laptop, or the like) and, in response, adjust graphical content and an acoustic field presented to the person in a manner similar to how such views and sounds would change in a physical environment. In some situations (e.g., for accessibility reasons), the XR system may adjust characteristic(s) of graphical content in the XR environment in response to representations of physical motions (e.g., vocal commands).

There are many different types of electronic systems that enable a person to sense and/or interact with various XR environments. Examples include head mountable systems, projection-based systems, heads-up displays (HUDs), vehicle windshields having integrated display capability, windows having integrated display capability, displays formed as lenses designed to be placed on a person's eyes (e.g., similar to contact lenses), headphones/earphones, speaker arrays, input systems (e.g., wearable or handheld controllers with or without haptic feedback), smartphones, tablets, and desktop/laptop computers. A head mountable system may have one or more speaker(s) and an integrated opaque display. Alternatively, a head mountable system may be configured to accept an external opaque display (e.g., a smartphone). The head mountable system may incorporate one or more imaging sensors to capture images or video of the physical environment, and/or one or more microphones to capture audio of the physical environment. Rather than an opaque display, a head mountable system may have a transparent or translucent display. The transparent or translucent display may have a medium through which light representative of images is directed to a person's eyes. The display may utilize digital light projection, OLEDs, LEDs, µLEDs, liquid crystal on silicon, laser scanning light source, or any combination of these technologies. The medium may be an optical waveguide, a hologram medium, an optical combiner, an optical reflector, or any combination thereof. In some implementations, the transparent or translucent display may be configured to become opaque selectively. Projection-based systems may employ retinal projection technology that projects graphical images onto a person's retina. Projection systems also may be configured to project virtual objects into the physical environment, for example, as a hologram or on a physical surface.

FIG. 1 is a block diagram of an example operating architecture 100 in accordance with some implementations. While pertinent features are shown, those of ordinary skill in the art will appreciate from the present disclosure that various other features have not been illustrated for the sake of brevity and so as not to obscure more pertinent aspects of the example implementations disclosed herein. To that end, as a non-limiting example, the operating architecture 100 includes an optional controller 110 and an electronic device 120 (e.g., a tablet, mobile phone, laptop, near-eye system, wearable computing device, or the like).

In some implementations, the controller 110 is configured to manage and coordinate an XR experience (sometimes also referred to herein as a "XR environment" or a "virtual environment" or a "graphical environment") for a user 150 and optionally other users. In some implementations, the controller 110 includes a suitable combination of software, firmware, and/or hardware. The controller 110 is described in greater detail below with respect to FIG. 2. In some implementations, the controller 110 is a computing device that is local or remote relative to the physical environment 105. For example, the controller 110 is a local server located within the physical environment 105. In another example, the controller 110 is a remote server located outside of the physical environment 105 (e.g., a cloud server, central server, etc.). In some implementations, the controller 110 is communicatively coupled with the electronic device 120 via one or more wired or wireless communication channels 144 (e.g., BLUETOOTH, IEEE 802.11x, IEEE 802.16x, IEEE 802.3x, etc.). In some implementations, the functions of the controller 110 are provided by the electronic device 120. As such, in some implementations, the components of the controller 110 are integrated into the electronic device 120.

In some implementations, the electronic device 120 is configured to present audio and/or video (A/V) content to the user 150. In some implementations, the electronic device 120 is configured to present a user interface (UI) and/or an XR environment 128 to the user 150. In some implementations, the electronic device 120 includes a suitable combination of software, firmware, and/or hardware. The electronic device 120 is described in greater detail below with respect to FIG. 3. For example, the electronic device 120 corresponds to a mobile phone, tablet, laptop, wearable computing device, or the like.

According to some implementations, the electronic device 120 presents an XR experience to the user 150 while the user 150 is physically present within a physical environment 105 that includes a table 107 within the field-of-view 111 of the electronic device 120. As such, in some implementations, the user 150 holds the electronic device 120 in his/her hand(s). In some implementations, while presenting the XR experience, the electronic device 120 is configured to present XR content (sometimes also referred to herein as "graphical content" or "virtual content"), including an XR cylinder 109, and to enable video pass-through of the physical environment 105 (e.g., including the table 107) on a display 122. For example, the XR environment 128, including the XR cylinder 109, is volumetric or three-dimensional (3D).

In one example, the XR cylinder 109 corresponds to display-locked content such that the XR cylinder 109 remains displayed at the same location on the display 122 as the FOV 111 changes due to translational and/or rotational movement of the electronic device 120. As another example, the XR cylinder 109 corresponds to world-locked content such that the XR cylinder 109 remains displayed at its origin location as the FOV 111 changes due to translational and/or rotational movement of the electronic device 120. As such, in this example, if the FOV 111 does not include the origin location, the XR environment 128 will not include the XR cylinder 109.

In some implementations, the display 122 corresponds to an additive display that enables optical see-through of the physical environment 105 including the table 107. For example, the display 122 correspond to a transparent lens, and the electronic device 120 corresponds to a pair of glasses worn by the user 150. As such, in some implementations, the electronic device 120 presents a user interface by projecting the XR content (sometimes also referred to herein as "graphical content" or "virtual content"), including an XR cylinder 109, onto the additive display, which is, in turn, overlaid on the physical environment 105 from the perspective of the user 150. In some implementations, the electronic device 120 presents the user interface by displaying the XR content (e.g., the XR cylinder 109) on the additive display, which is, in turn, overlaid on the physical environment 105 from the perspective of the user 150.

In some implementations, the user 150 wears the electronic device 120 such as a near-eye system. As such, the electronic device 120 includes one or more displays provided to display the XR content (e.g., a single display or one for each eye). For example, the electronic device 120 encloses the field-of-view of the user 150. In such implementations, the electronic device 120 presents the XR environment 128 by displaying data corresponding to the XR environment 128 on the one or more displays or by projecting data corresponding to the XR environment 128 onto the retinas of the user 150.

In some implementations, the electronic device 120 includes an integrated display (e.g., a built-in display) that displays the XR environment 128. In some implementations, the electronic device 120 includes a head-mountable enclosure. In various implementations, the head-mountable enclosure includes an attachment region to which another device with a display can be attached. For example, in some implementations, the electronic device 120 can be attached to the head-mountable enclosure. In various implementations, the head-mountable enclosure is shaped to form a receptacle for receiving another device that includes a display (e.g., the electronic device 120). For example, in some implementations, the electronic device 120 slides/snaps into or otherwise attaches to the head-mountable enclosure. In some implementations, the display of the device attached to the head-mountable enclosure presents (e.g., displays) the XR environment 128. In some implementations, the electronic device 120 is replaced with an XR chamber, enclosure, or room configured to present XR content in which the user 150 does not wear the electronic device 120.

In some implementations, the controller 110 and/or the electronic device 120 cause an XR representation of the user 150 to move within the XR environment 128 based on movement information (e.g., body pose data, eye tracking data, hand/limb tracking data, etc.) from the electronic device 120 and/or optional remote input devices within the physical environment 105. In some implementations, the optional remote input devices correspond to fixed or movable sensory equipment within the physical environment 105 (e.g., image sensors, depth sensors, infrared (IR) sensors, event cameras, microphones, etc.). In some implementations, each of the remote input devices is configured to collect/capture input data and provide the input data to the controller 110 and/or the electronic device 120 while the user 150 is physically within the physical environment 105. In some implementations, the remote input devices include microphones, and the input data includes audio data associated with the user 150 (e.g., speech samples). In some implementations, the remote input devices include image sensors (e.g., cameras), and the input data includes images of the user 150. In some implementations, the input data characterizes body poses of the user 150 at different times. In some implementations, the input data characterizes head poses of the user 150 at different times. In some implementations, the input data characterizes hand tracking information associated with the hands of the user 150 at different times. In some implementations, the input data characterizes the velocity and/or acceleration of body parts of the user 150 such as his/her hands. In some implementations, the input data indicates joint positions and/or joint orientations of the user 150. In some implementations, the remote input devices include feedback devices such as speakers, lights, or the like.

Figure 2:
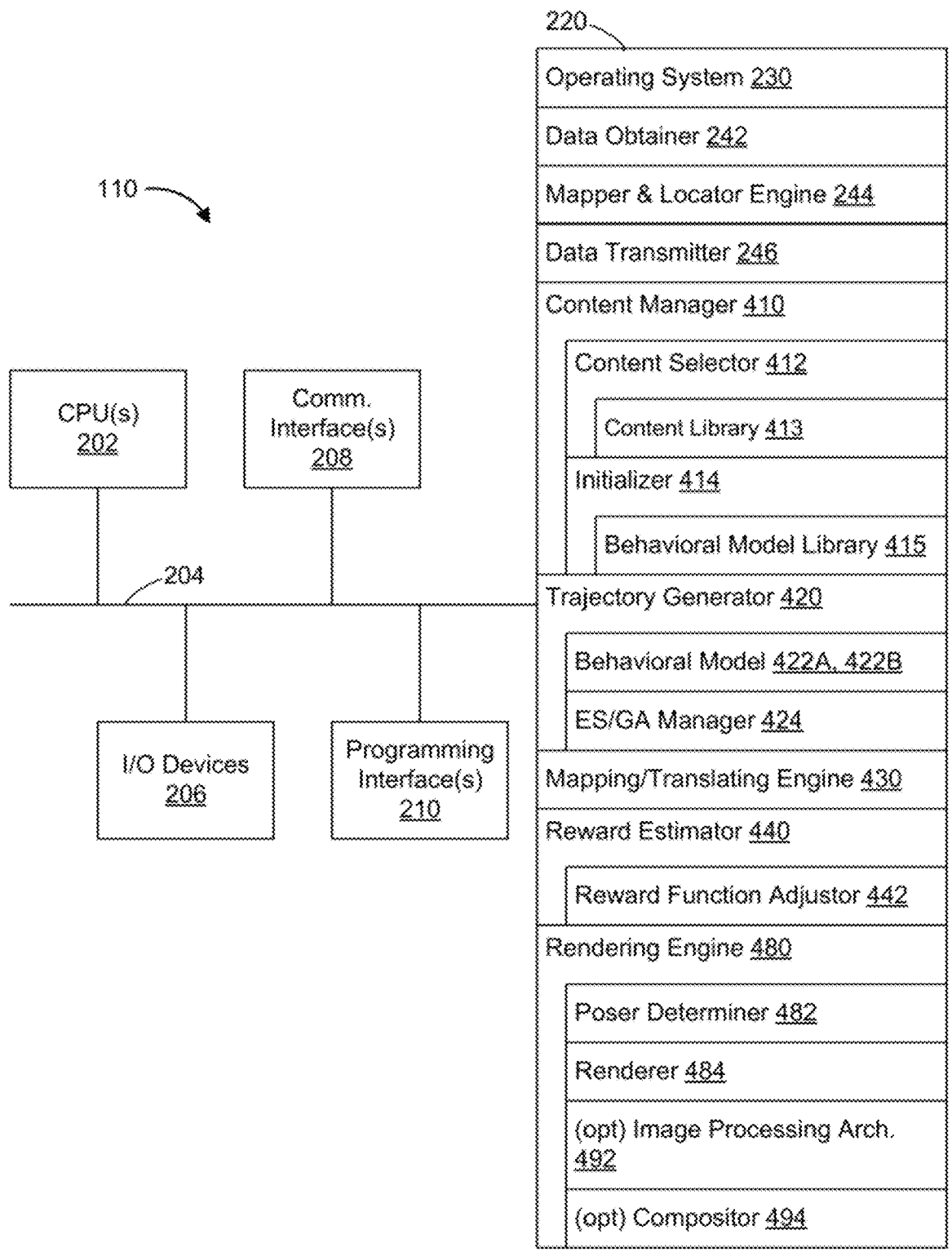
FIG. 2 is a block diagram of an example controller in accordance with some implementations.

FIG. 2 is a block diagram of an example of the controller 110 in accordance with some implementations. While certain specific features are illustrated, those skilled in the art will appreciate from the present disclosure that various other features have not been illustrated for the sake of brevity, and so as not to obscure more pertinent aspects of the implementations disclosed herein. To that end, as a non-limiting example, in some implementations, the controller 110 includes one or more processing units 202 (e.g., microprocessors, application-specific integrated-circuits (ASICs), field-programmable gate arrays (FPGAs), graphics processing units (GPUs), central processing units (CPUs), processing cores, and/or the like), one or more input/output (I/O) devices 206, one or more communication interfaces 208 (e.g., universal serial bus (USB), IEEE 802.3x, IEEE 802.11x, IEEE 802.16x, global system for mobile communications (GSM), code division multiple access (CDMA), time division multiple access (TDMA), global positioning system (GPS), infrared (IR), BLUETOOTH, ZIGBEE, and/or the like type interface), one or more programming (e.g., I/O) interfaces 210, a memory 220, and one or more communication buses 204 for interconnecting these and various other components.

In some implementations, the one or more communication buses 204 include circuitry that interconnects and controls communications between system components. In some implementations, the one or more I/O devices 206 include at least one of a keyboard, a mouse, a touchpad, a touch-screen, a joystick, one or more microphones, one or more speakers, one or more image sensors, one or more displays, and/or the like.

The memory 220 includes high-speed random-access memory, such as dynamic random-access memory (DRAM), static random-access memory (SRAM), double-data-rate random-access memory (DDR RAM), or other random-access solid-state memory devices. In some implementations, the memory 220 includes non-volatile memory, such as one or more magnetic disk storage devices, optical disk storage devices, flash memory devices, or other non-volatile solid-state storage devices. The memory 220 optionally includes one or more storage devices remotely located from the one or more processing units 202. The memory 220 comprises a non-transitory computer readable storage medium. In some implementations, the memory 220 or the non-transitory computer readable storage medium of the memory 220 stores the following programs, modules and data structures, or a subset thereof described below with respect to FIG. 2.

The operating system 230 includes procedures for handling various basic system services and for performing hardware dependent tasks.

In some implementations, the data obtainer 242 is configured to obtain data (e.g., captured image frames of the physical environment 105, presentation data, input data, user interaction data, camera pose tracking information, eye tracking information, head/body pose tracking information, hand/limb tracking information, sensor data, location data, etc.) from at least one of the I/O devices 206 of the controller 110, the I/O devices and sensor 306 of the electronic device 120, and the optional remote input devices. To that end, in various implementations, the data obtainer 242 includes instructions and/or logic therefor, and heuristics and metadata therefor.

In some implementations, the mapper and locator engine 244 is configured to map the physical environment 105 and to track the position/location of at least the electronic device 120 or the user 150 with respect to the physical environment 105. To that end, in various implementations, the mapper and locator engine 244 includes instructions and/or logic therefor, and heuristics and metadata therefor.

In some implementations, the data transmitter 246 is configured to transmit data (e.g., presentation data such as rendered image frames associated with the XR environment, location data, etc.) to at least the electronic device 120. To that end, in various implementations, the data transmitter 246 includes instructions and/or logic therefor, and heuristics and metadata therefor.

In some implementations, a content manager 410 is configured to select A/V and/or XR content, coordinate A/V and/or XR content, setup A/V and/or XR content, and/or the like. The content manager 410 is described in more detail below with reference to FIGS. 4A-4C. To that end, in various implementations, the content manager 410 includes instructions and/or logic therefor, and heuristics and metadata therefor. In some implementations, the content manager 410 includes a content selector 412 and an initializer 414.

In some implementations, the content selector 412 is configured to select a virtual agent and/or associated XR content from a content library 413 based on a virtual agent training routine or one or more user requests and/or inputs (e.g., a voice command, a selection from a user interface (UI) menu of virtual agents and/or associated XR content items, and/or the like). The content selector 412 is described in more detail below with reference to FIGS. 4A-4C. To that end, in various implementations, the content selector 412 includes instructions and/or logic therefor, and heuristics and metadata therefor.

In some implementations, the content library 413 includes a plurality of content items such as A/V content, virtual agents, and/or XR content, objects, items, scenery, etc. In some implementations, the virtual agents correspond to humanoids, animals, vehicles, objects, robots, androids, anthropomorphic entities, and/or the like. As one example, each virtual agent is associated with a locomotive profile (e.g., a height, a radius, a stride size, run speed, jump height, lifting strength, etc.), a set of potential actions/tasks (e.g., walk, run, push, pull, pick-up, carry, dialogue, monologue, etc.), and/or the like. As another example, the XR content includes 3D reconstructions of user captured videos, movies, TV episodes, and/or other XR content. In some implementations, the content library 413 is pre-populated or manually authored by the user 150. In some implementations, the content library 413 is located locally relative to the controller 110. In some implementations, the content library 413 is located remotely from the controller 110 (e.g., at a remote server, a cloud server, or the like).

In some implementations, the initializer 414 is configured to select a behavioral model from a behavioral model library 415 based on the virtual agent selected by the content selector 412. The content selector 412 is described in more detail below with reference to FIGS. 4A-4C. To that end, in various implementations, the initializer 414 includes instructions and/or logic therefor, and heuristics and metadata therefor.

In some implementations, the behavioral model library 415 includes a plurality of generic, untrained behavioral models for virtual agents. In some implementations, the behavioral model library 415 includes one or more behavioral models specific to each virtual agent. For example, the behavioral models correspond to single task or multi-task decision trees, probabilistic behavior trees (PBTs), decision matrices, look-up tables, and/or the like. In some implementations, the behavioral model library 415 is pre-populated. In some implementations, the behavioral model library 415 is manually authored by the user 150. In some implementations, the behavioral model library 415 includes behavioral models that have been adapted to the preferences, likes, dislikes, and/or the like of the user 150. In some implementations, the behavioral model library 415 is located locally relative to the controller 110. In some implementations, the behavioral model library 415 is located remotely from the controller 110 (e.g., at a remote server, a cloud server, or the like).

In some implementations, a trajectory generator 420 is configured to generate behavioral trajectories (e.g., actions and/or associated physical motion planning (PMP)) for a virtual agent based on the current behavioral model 422A or 422B for the virtual agent and, optionally, a current state of a XR environment in which the virtual agent is situated. In some implementations, the behavioral model 422A corresponds to an untrained behavioral model that has not yet been adapted to the preferences, likes, dislikes, and/or the like of the user 150. In some implementations, the behavioral model 422B corresponds to a trained behavioral model that has been adapted to the preferences, likes, dislikes, and/or the like of the user 150. In some implementations, the XR environment is partially or fully virtual. The trajectory generator 420 is described in more detail below with reference to FIGS. 4A and 4C. To that end, in various implementations, the trajectory generator 420 includes instructions and/or logic therefor, and heuristics and metadata therefor.

In some implementations, the trajectory generator 420 includes an evolutionary strategies/genetic algorithm (ES/GA) manager 424. In some implementations, the trajectory generator 420 is configured to employ ES or GA technique(s) to adapt the current behavioral model to the preferences, likes, dislikes, and/or the like of the user 150. The ES/GA manager 424 is described in more detail below with reference to FIG. 4B. To that end, in various implementations, the ES/GA manager 424 includes instructions and/or logic therefor, and heuristics and metadata therefor. One of ordinary skill in the art will appreciate that the ES/GA manager 424 may be replaced with various other algorithms and/or techniques that perturb the one or more tunable parameters of the current behavioral model such as a neural network, deep neural network (DNN), convolutional neural network (CNN), support vector machine (SVM), relevance vector machine (RVM), random forest algorithm, or the like.

In some implementations, the mapping/translating engine 430 is configured to map, translate, normalize, etc. example input data into example behavioral trajectories. According to various implementations, the example behavioral trajectories are used to adapt the current behavioral model to the preferences, likes, dislikes, and/or the like of the user 150. For example, the mapping/translating engine 430 normalizes the example input data based on the modality, parameters, format, structure, etc. of the behavioral trajectories generated by the trajectory generator 420. The mapping/translating engine 430 is described in more detail below with reference to FIG. 4A. To that end, in various implementations, the mapping/translating engine 430 includes instructions and/or logic therefor, and heuristics and metadata therefor.

As one example, the example input data corresponds to pre-existing video content, such as movies, TV episodes, or the like, with actions/tasks for the virtual agent to emulate. As another example, the example input data corresponds to actions performed by the user 150 while controlling or driving the virtual agent within the virtual environment as well as any associated user feedback relative thereto. As yet another example, the example input data corresponds to crowd-sourced actions/tasks and/or behavioral trajectories for the virtual agent. As yet another example, the example input data corresponds to random or pseudo-random generated actions/tasks and/or behavioral trajectories for the virtual agent as well as any associated user feedback relative thereto. As yet another example, the example input data corresponds to user interactions with the virtual agent.

In some implementations, a reward estimator 440 is configured to generate a reward signal based on: (A) the behavioral trajectories generated by the trajectory generator 420 and (B) the example behavioral trajectories from the mapping/translating engine 430. In some implementations, the reward function adjustor 442 is configured to set the weights for the behavioral trajectories generated by the trajectory generator 420 and the example behavioral trajectories from the mapping/translating engine 430 based on user feedback (e.g., positive and/or negative feedback) relative thereto. According to various implementations, the example behavioral trajectories may be weighted greater than the behavioral trajectories generated by the trajectory generator 420. The reward estimator 440 is described in more detail below with reference to FIG. 4A. To that end, in various implementations, the reward estimator 440 includes instructions and/or logic therefor, and heuristics and metadata therefor.

In some implementations, a rendering engine 480 is configured to render a XR environment (or image frame(s) associated therewith) including the virtual agent. To that end, in various implementations, the rendering engine 480 includes instructions and/or logic therefor, and heuristics and metadata therefor. In some implementations, the rendering engine 480 includes a pose determiner 482, a renderer 484, an optional image processing architecture 492, and an optional compositor 494.

In some implementations, the pose determiner 482 is configured to determine a current camera pose of the electronic device 120 and/or the user 150 relative to the A/V content, virtual agent, and/or XR environment. The pose determiner 482 is described in more detail below with reference to FIG. 4C. To that end, in various implementations, the pose determiner 482 includes instructions and/or logic therefor, and heuristics and metadata therefor.

In some implementations, the renderer 484 is configured to render the A/V content, the virtual agent and/or the XR content according to the current camera pose relative thereto. The renderer 484 is described in more detail below with reference to FIG. 4C. To that end, in various implementations, the renderer 484 includes instructions and/or logic therefor, and heuristics and metadata therefor.

In some implementations, the optional image processing architecture 492 is configured to obtain (e.g., receive, retrieve, or capture) an image stream including one or more images of the physical environment 105 from the current camera pose of the electronic device 120 and/or the user 150. In some implementations, the image processing architecture 492 is also configured to perform one or more image processing operations on the image stream such as warping, color correction, gamma correction, sharpening, noise reduction, white balance, and/or the like. The image processing architecture 492 is described in more detail below with reference to FIG. 4C. To that end, in various implementations, the image processing architecture 492 includes instructions and/or logic therefor, and heuristics and metadata therefor.

In some implementations, the optional compositor 494 is configured to composite the rendered A/V content, virtual agent, and/or XR content with the processed image stream of the physical environment 105 from the image processing architecture 492 to produce rendered image frames of the XR environment for display. The compositor 494 is described in more detail below with reference to FIG. 4C. To that end, in various implementations, the compositor 494 includes instructions and/or logic therefor, and heuristics and metadata therefor. One of ordinary skill in the art will appreciate that the optional image processing architecture 492 and the optional compositor 494 may not be applicable for fully virtual environments.

Although the data obtainer 242, the mapper and locator engine 244, the data transmitter 246, the content manager 410, the trajectory generator 420, the mapping/translating engine 430, the reward estimator 440, and the rendering engine 480 are shown as residing on a single device (e.g., the controller 110), it should be understood that in other implementations, any combination of the data obtainer 242, the mapper and locator engine 244, the data transmitter 246, the content manager 410, the trajectory generator 420, the mapping/translating engine 430, the reward estimator 440, and the rendering engine 480 may be located in separate computing devices.

In some implementations, the functions and/or components of the controller 110 are combined with or provided by the electronic device 120 shown below in FIG. 3. Moreover, FIG. 2 is intended more as a functional description of the various features which be present in a particular implementation as opposed to a structural schematic of the implementations described herein. As recognized by those of ordinary skill in the art, items shown separately could be combined and some items could be separated. For example, some functional modules shown separately in FIG. 2 could be implemented in a single module and the various functions of single functional blocks could be implemented by one or more functional blocks in various implementations. The actual number of modules and the division of particular functions and how features are allocated among them will vary from one implementation to another and, in some implementations, depends in part on the particular combination of hardware, software, and/or firmware chosen for a particular implementation.

Figure 3:
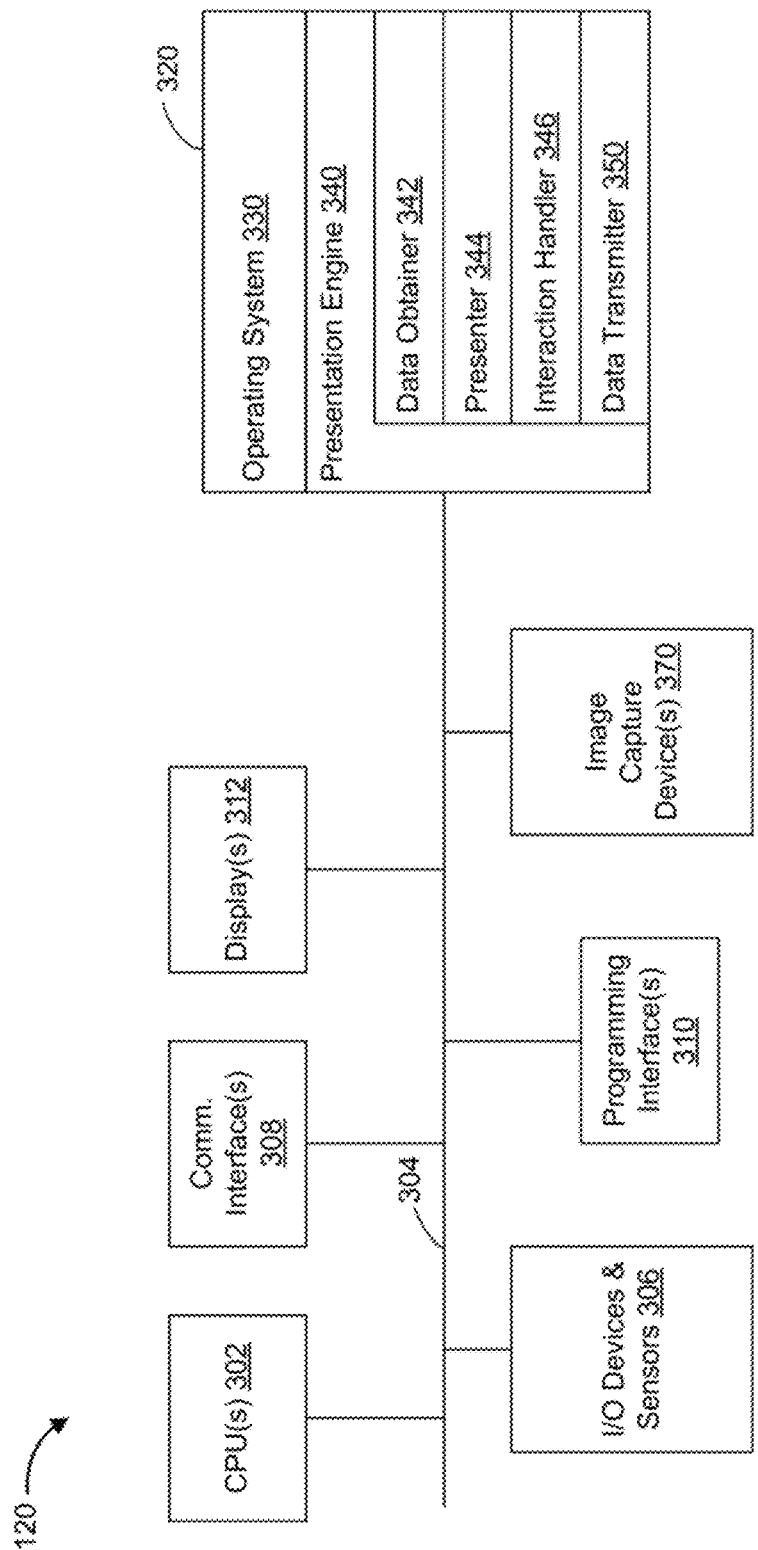
FIG. 3 is a block diagram of an example electronic device in accordance with some implementations.

FIG. 3 is a block diagram of an example of the electronic device 120 (e.g., a mobile phone, tablet, laptop, near-eye system, wearable computing device, or the like) in accordance with some implementations. While certain specific features are illustrated, those skilled in the art will appreciate from the present disclosure that various other features have not been illustrated for the sake of brevity, and so as not to obscure more pertinent aspects of the implementations disclosed herein. To that end, as a non-limiting example, in some implementations, the electronic device 120 includes one or more processing units 302 (e.g., microprocessors, ASICs, FPGAs, GPUs, CPUs, processing cores, and/or the like), one or more input/output (I/O) devices and sensors 306, one or more communication interfaces 308 (e.g., USB, IEEE 802.3x, IEEE 802.11x, IEEE 802.16x, GSM, CDMA, TDMA, GPS, IR, BLUETOOTH, ZIGBEE, and/or the like type interface), one or more programming (e.g., I/O) interfaces 310, one or more displays 312, an image capture device 370 (e.g., one or more optional interior- and/or exterior-facing image sensors), a memory 320, and one or more communication buses 304 for interconnecting these and various other components.

In some implementations, the one or more communication buses 304 include circuitry that interconnects and controls communications between system components. In some implementations, the one or more I/O devices and sensors 306 include at least one of an inertial measurement unit (IMU), an accelerometer, a gyroscope, a magnetometer, a thermometer, one or more physiological sensors (e.g., blood pressure monitor, heart rate monitor, blood oximetry monitor, blood glucose monitor, etc.), one or more microphones, one or more speakers, a haptics engine, a heating and/or cooling unit, a skin shear engine, one or more depth sensors (e.g., structured light, time-of-flight, LiDAR, or the like), a localization and mapping engine, an eye tracking engine, a body/head pose tracking engine, a hand/limb tracking engine, a camera pose tracking engine, or the like.

In some implementations, the one or more displays 312 are configured to present the XR environment to the user. In some implementations, the one or more displays 312 are also configured to present flat video content to the user (e.g., a 2-dimensional or "flat" AVI, FLV, WMV, MOV, MP4, or the like file associated with a TV episode or a movie, or live video pass-through of the physical environment 105). In some implementations, the one or more displays 312 correspond to touchscreen displays. In some implementations, the one or more displays 312 correspond to holographic, digital light processing (DLP), liquid-crystal display (LCD), liquid-crystal on silicon (LCoS), organic light-emitting field-effect transitory (OLET), organic light-emitting diode (OLED), surface-conduction electron-emitter display (SED), field-emission display (FED), quantum-dot light-emitting diode (QD-LED), micro-electro-mechanical system (MEMS), and/or the like display types. In some implementations, the one or more displays 312 correspond to diffractive, reflective, polarized, holographic, etc. waveguide displays. For example, the electronic device 120 includes a single display. In another example, the electronic device 120 includes a display for each eye of the user. In some implementations, the one or more displays 312 are capable of presenting AR and VR content. In some implementations, the one or more displays 312 are capable of presenting AR or VR content.

In some implementations, the image capture device 370 correspond to one or more RGB cameras (e.g., with a complementary metal-oxide-semiconductor (CMOS) image sensor or a charge-coupled device (CCD) image sensor), IR image sensors, event-based cameras, and/or the like. In some implementations, the image capture device 370 includes a lens assembly, a photodiode, and a front-end architecture.

The memory 320 includes high-speed random-access memory, such as DRAM, SRAM, DDR RAM, or other random-access solid-state memory devices. In some implementations, the memory 320 includes non-volatile memory, such as one or more magnetic disk storage devices, optical disk storage devices, flash memory devices, or other non-volatile solid-state storage devices. The memory 320 optionally includes one or more storage devices remotely located from the one or more processing units 302. The memory 320 comprises a non-transitory computer readable storage medium. In some implementations, the memory 320 or the non-transitory computer readable storage medium of the memory 320 stores the following programs, modules and data structures, or a subset thereof including an optional operating system 330 and a presentation engine 340.

The operating system 330 includes procedures for handling various basic system services and for performing hardware dependent tasks. In some implementations, the presentation engine 340 is configured to present media items and/or XR content to the user via the one or more displays 312. To that end, in various implementations, the presentation engine 340 includes a data obtainer 342, a presenter 344, an interaction handler 346, and a data transmitter 350.

In some implementations, the data obtainer 342 is configured to obtain data (e.g., presentation data such as rendered image frames associated with the user interface/XR environment, input data, user interaction data, head tracking information, camera pose tracking information, eye tracking information, sensor data, location data, etc.) from at least one of the I/O devices and sensors 306 of the electronic device 120, the controller 110, and the remote input devices. To that end, in various implementations, the data obtainer 342 includes instructions and/or logic therefor, and heuristics and metadata therefor.

In some implementations, the presenter 344 is configured to present and update A/V content and/or XR content (e.g., the rendered image frames associated with the user interface or the XR environment) via the one or more displays 312. To that end, in various implementations, the presenter 344 includes instructions and/or logic therefor, and heuristics and metadata therefor.

In some implementations, the interaction handler 346 is configured to detect user requests/inputs and/or user interactions with the presented A/V content and/or XR content (e.g., gestural inputs detected via hand tracking, eye gaze inputs detected via eye tracking, voice commands, etc.). To that end, in various implementations, the interaction handler 346 includes instructions and/or logic therefor, and heuristics and metadata therefor.

In some implementations, the data transmitter 350 is configured to transmit data (e.g., presentation data, location data, user interaction data, head tracking information, camera pose tracking information, eye tracking information, etc.) to at least the controller 110. To that end, in various implementations, the data transmitter 350 includes instructions and/or logic therefor, and heuristics and metadata therefor.

Although the data obtainer 342, the presenter 344, the interaction handler 346, and the data transmitter 350 are shown as residing on a single device (e.g., the electronic device 120), it should be understood that in other implementations, any combination of the data obtainer 342, the presenter 344, the interaction handler 346, and the data transmitter 350 may be located in separate computing devices.

Moreover, FIG. 3 is intended more as a functional description of the various features which be present in a particular implementation as opposed to a structural schematic of the implementations described herein. As recognized by those of ordinary skill in the art, items shown separately could be combined and some items could be separated. For example, some functional modules shown separately in FIG. 3 could be implemented in a single module and the various functions of single functional blocks could be implemented by one or more functional blocks in various implementations. The actual number of modules and the division of particular functions and how features are allocated among them will vary from one implementation to another and, in some implementations, depends in part on the particular combination of hardware, software, and/or firmware chosen for a particular implementation.

Figure 4A:
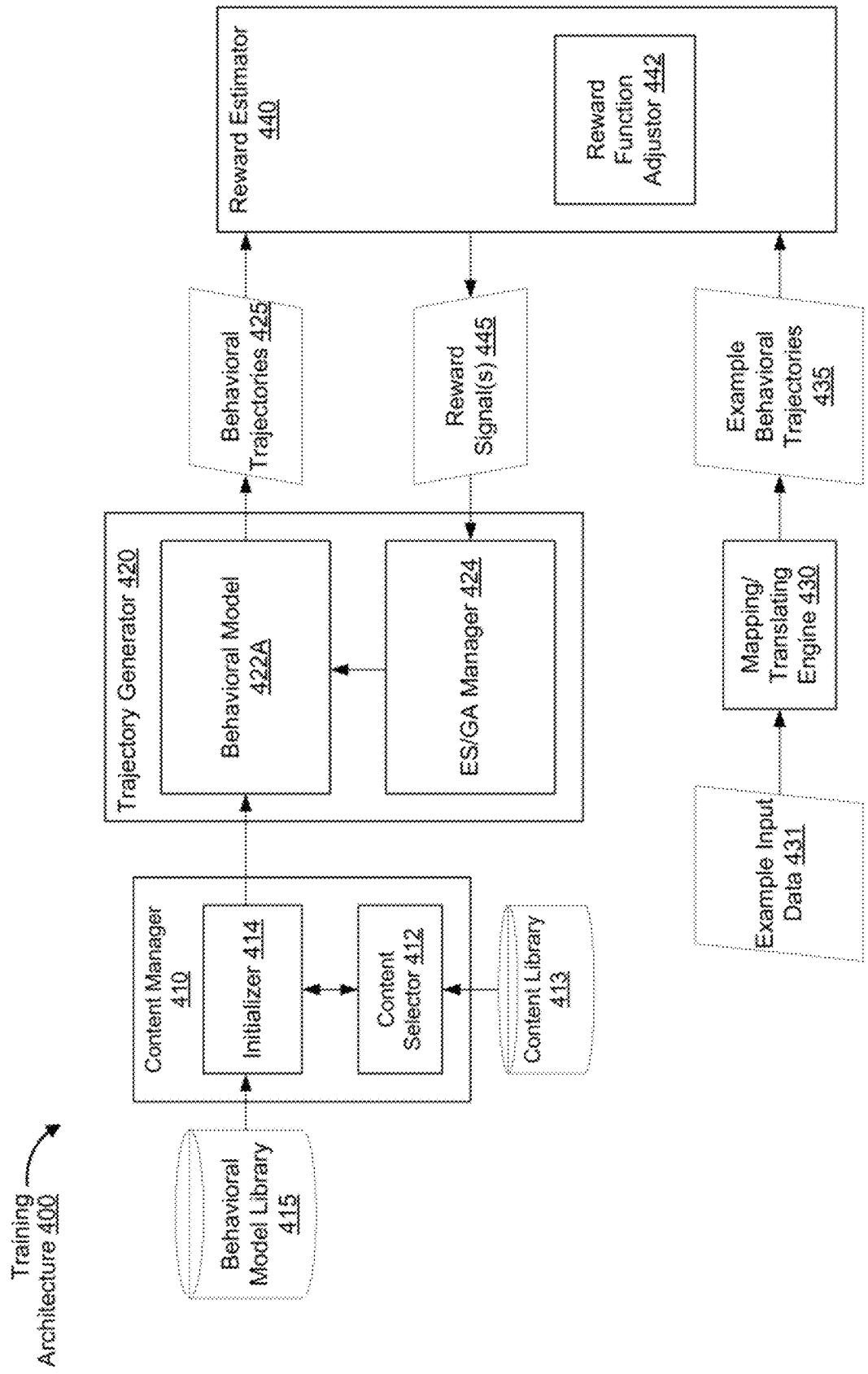
FIG. 4A is a block diagram of an example training architecture in accordance with some implementations.

FIG. 4A is a block diagram of an example training architecture 400 in accordance with some implementations. While pertinent features are shown, those of ordinary skill in the art will appreciate from the present disclosure that various other features have not been illustrated for the sake of brevity and so as not to obscure more pertinent aspects of the example implementations disclosed herein. To that end, as a non-limiting example, the training architecture 400 is included in a computing system such as the controller 110 shown in FIGS. 1 and 2; the electronic device 120 shown in FIGS. 1 and 3; and/or a suitable combination thereof.

As shown in FIG. 4A, the content selector 412 selects a virtual agent from the content library 413 based on a virtual agent training routine or one or more user requests and/or inputs (e.g., a voice command, a selection from a user interface (UI) menu of virtual agents and/or associated XR content items, and/or the like). The initializer 414 selects a behavioral model 422A from the behavioral model library 415 based on the virtual agent selected by the content selector 412. As one example, the behavioral model 422A corresponds to a generic, pre-existing behavioral model that is untrained. As another example, the behavioral model 422A corresponds to crowd-sourced behavioral model associated with one or more other uses that have similar preferences, likes, dislikes, demographics, etc. to the user 150. For example, the behavioral model 422A corresponds to a single task or multi-task decision tree, PBT, decision matrix, look-up table, and/or the like.

As shown in FIG. 4A, the trajectory generator 420 generates one or more behavioral trajectories 425 for the virtual agent based at least in part on the behavioral model 422A and a current state of a XR environment (e.g., a XR environment in which the virtual agent has been instantiated, a test or default XR environment, or the like).

As shown in FIG. 4A, the mapping/translating engine 430 obtains (e.g., receives, retrieves, or the like) example input data 431 from the user 150, a local source, a remote source, and/or the like. In some implementations, the mapping/translating engine 430 maps, translates, normalizes, etc. the example input data 431 into example behavioral trajectories 435. For example, the mapping/translating engine 430 normalizes the example input data 431 based on the modality, parameters, format, structure, etc. of the behavioral trajectories 425 generated by the trajectory generator 420.

As one example, the example input data 431 corresponds to pre-existing video content, such as movies, TV episodes, or the like, with actions/tasks for the virtual agent to emulate. As another example, the example input data 431 corresponds to actions performed by the user 150 while controlling or driving the virtual agent within the virtual environment as well as any associated user feedback relative thereto. As yet another example, the example input data 431 corresponds to actions and/or crowd-sourced behavioral trajectories for the virtual agent. As yet another example, the example input data 431 corresponds to randomly or pseudo-randomly generated actions and/or behavioral trajectories for the virtual agent as well as any associated user feedback relative thereto. As yet another example, the example input data 431 corresponds to user interactions with the virtual agent.

As shown in FIG. 4A, the reward estimator 440 generates one or more reward signals 445 based on: (A) the behavioral trajectories 435; and (B) the example behavioral trajectories 435. In some implementations, prior to subjecting the aforementioned trajectories to a reward function, the reward function adjustor 442 sets weights for the behavioral trajectories 435 and the example behavioral trajectories 435 based on user feedback (e.g., positive, and/or negative feedback) relative thereto. According to various implementations, the example behavioral trajectories 435 may be weighted greater than the behavioral trajectories 425.

In some implementations, the one or more reward signals 445 are provided to the ES/GA manager 424 in order to adjust at least some of the one or more tunable parameters of the behavioral model 422A. According to some implementations, the ES/GA manager 424 corresponds to a derivative-free algorithm. As such, for example, the ES/GA manager 424 adapts the behavioral model 422A to the preferences, likes, dislikes, and/or the like of the user 150. The ES/GA manager 424 is described in more detail below with respect to FIG. 4B. One of ordinary skill in the art will appreciate that the ES/GA manager 424 may be replaced with various other algorithms and/or techniques that perturb the one or more tunable parameters of the behavioral model 422A such as a neural network, DNN, CNN, SVM, RVM, random forest algorithm, or the like.

Figure 4B:
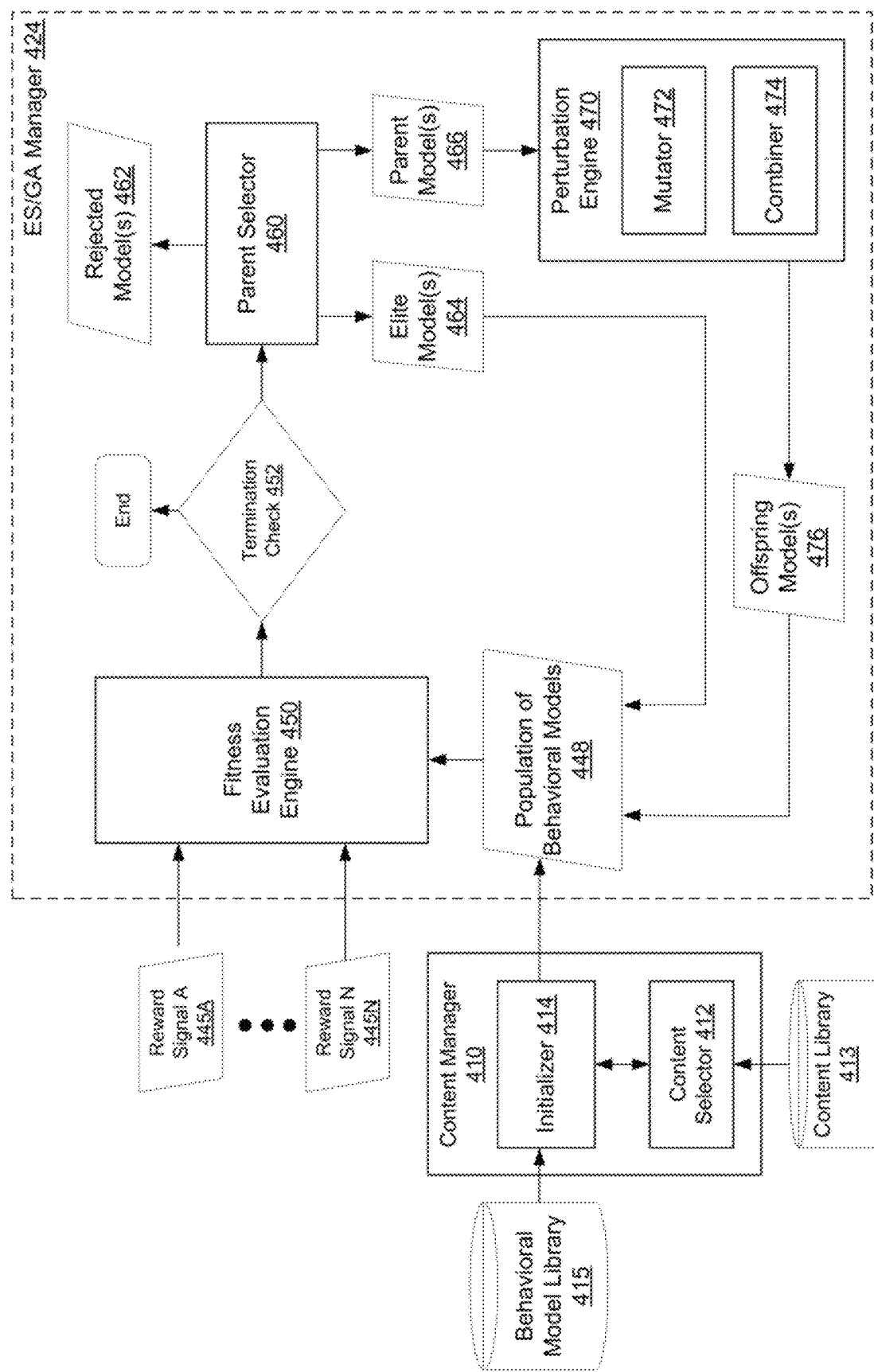
FIG. 4B is a block diagram of an example evolutionary strategies/genetic algorithm (ES/GA) manager associated with the training architecture in FIG. 4A in accordance with some implementations.

FIG. 4B is a block diagram of the ES/GA manager 424 in the training architecture 400 in FIG. 4A in accordance with some implementations. While pertinent features are shown, those of ordinary skill in the art will appreciate from the present disclosure that various other features have not been illustrated for the sake of brevity and so as not to obscure more pertinent aspects of the example implementations disclosed herein. The components in FIG. 4B is similar to and adapted from the components in FIG. 4A. As such, similar reference numbers are used herein and only the differences will be described for the sake of brevity. To that end, as a non-limiting example, the ES/GA manager 424 is included in a computing system such as the controller 110 shown in FIGS. 1 and 2; the electronic device 120 shown in FIGS. 1 and 3; and/or a suitable combination thereof.

In some implementations, the ES/GA manager 424 uses ES and/or GA technique(s) to adapt the current behavioral model to the preferences, likes, dislikes, and/or the like of the user 150. In FIG. 4B, the ES/GA manager 424 leverages a population of behavioral models that are evaluated in parallel in order to converge to a trained behavioral model that has been adapted to the preferences, likes, dislikes, and/or the like of the user 150.

As shown in FIG. 4B, the content selector 412 selects a virtual agent from the content library 413 based on one or more user requests and/or inputs (e.g., a voice command, a selection from a UI menu of virtual agents and/or associated XR content items, and/or the like). The initializer 414 selects an initial population of behavioral models 448 from the behavioral model library 415 based on the virtual agent selected by the content selector 412. As one example, the initializer 414 selects a plurality of generic, pre-existing behavioral models from the behavioral model library 413 for the initial population of behavioral models 448. As another example, the initializer 414 selects one or more generic, pre-existing behavioral models from the behavioral model library 413 and modifies the one or more selected behavioral models to generate a larger corpus of behavioral models for the initial population of behavioral models 448.

For example, the trajectory generator 420 in FIG. 4A generates a set of behavioral trajectories based on each behavioral model within the initial population of behavioral models 448. Continuing with this example, the reward estimator 440 generates reward signals 445A, . . . , 445N for each of the behavioral models within the initial population of behavioral models 448 relative to the example behavioral trajectories 435.

As shown in FIG. 4B, the fitness evaluation engine 450 generates a fitness score for each of the behavioral models within the initial population of behavioral models 448 based on the reward signals 445A, . . . , 445N. In FIG. 4B, the ES/GA manager 424 performs a termination check 452 based on a fitness score gradient 500 in FIG. 5. If a fitness score for a respective behavioral model meets or exceeds threshold value 530, the training process ends, and the parent selector 460 labels the respective behavioral model a finalized/converged model 468 for usage during runtime (e.g., the trained behavioral model) because the finalized/converged model 468 has been adapted to the preferences, likes, dislikes, and/or the like of the user 150. In some implementations, the finalized/converged model 468 is stored in the behavioral model library 415 in association with the virtual agent for future use during runtime. However, if the fitness score for the respective behavioral model does not meet or exceed the threshold value 530, the training process continues, and the initial population of behavioral models 448 is updated for the next iteration.

Figure 5:
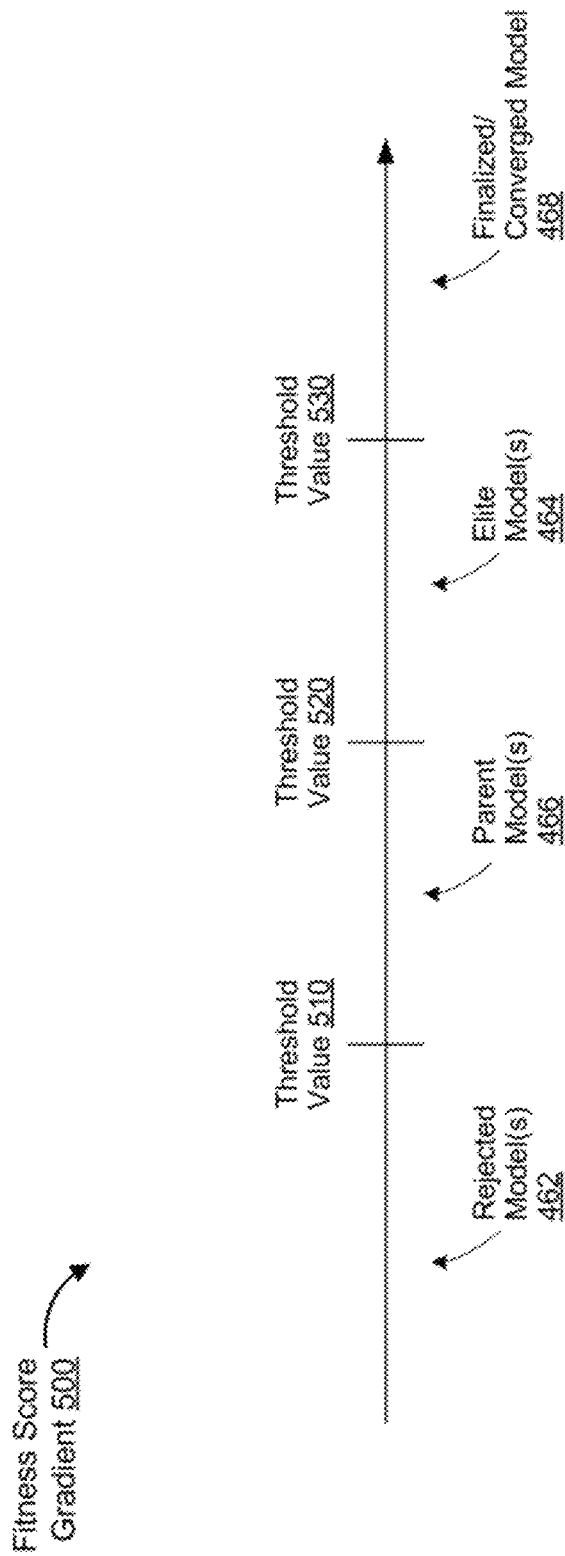
FIG. 5 is an illustration of a fitness score gradient in accordance with some implementations.

As shown in FIGS. 4B and 5, if the fitness score for the respective behavioral model is between threshold values 520 and 530, the parent selector 460 labels the respective behavioral model as one of the elite models 464 that is passed through to the next iteration. With reference to FIGS. 4B and 5, if the fitness score for the respective behavioral model is between threshold values 510 and 520, the parent selector 460 labels the respective behavioral model as one of the parent models 466 that is passed to a perturbation engine 470. With continued reference to FIGS. 4B and 5, if the fitness score for the respective behavioral model is below the threshold value 510, the parent selector 460 labels the respective behavioral model as one of the rejected models 462 that is discarded. In some implementations, the threshold values 510, 520, and/or 530 are pre-defined, deterministic, and/or the like.

As shown in FIG. 4B, the perturbation engine 470 subjects the parent models 466 to the mutator 472 and/or the combiner 474 to generate offspring models 476. The mutator 472 mutates at least some of the parent models 466. For example, the mutator 472 randomly or pseudo-randomly adjusts at least some of the tunable parameters of the parent models 466. The combiner 474 combines pairs of at least some of the parent models 466. For example, the combiner 474 interchanges, interleaves, and/or cross-pollinates at least some of the tunable parameters between the respective pair of parent models 466. For example, a respective behavioral model may be be used more than once by the mutator 472 and/or the combiner 474 as one of the parent models 466.

As shown in FIG. 4B, the perturbation engine 470 generates the offspring models 476 by mutating and/or combing at least some of the parent models 466. As such, as illustrated in FIG. 4B, the offspring models 476 and the elite models 464 become the updated population of behavioral models 448 for the next iteration where the process described above repeats.

Figure 4C:
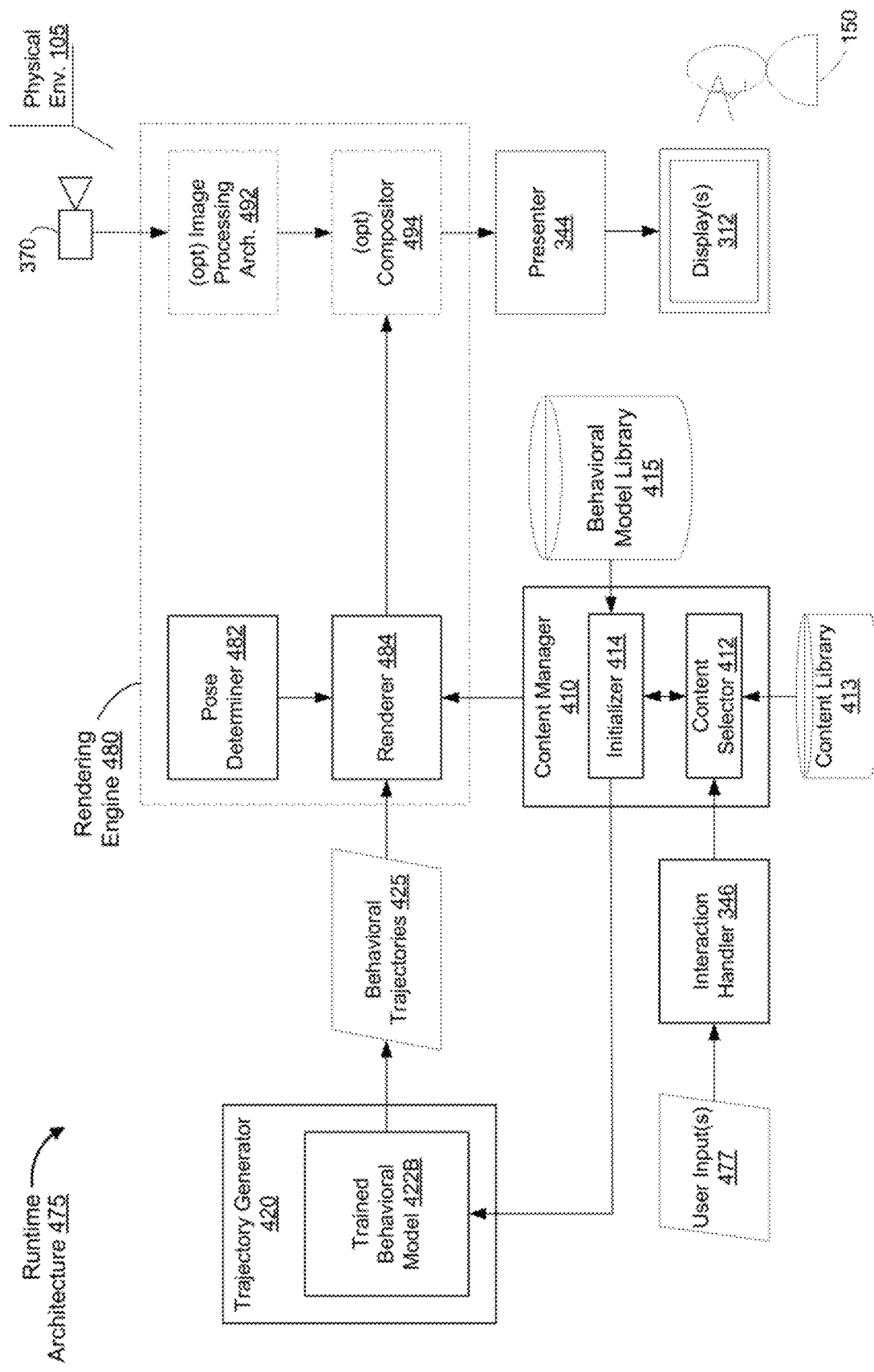
FIG. 4C is a block diagram of an example runtime architecture in accordance with some implementations.

FIG. 4C is a block diagram of a runtime architecture 475 in accordance with some implementations. While pertinent features are shown, those of ordinary skill in the art will appreciate from the present disclosure that various other features have not been illustrated for the sake of brevity and so as not to obscure more pertinent aspects of the example implementations disclosed herein. The components in FIG. 4C is similar to and adapted from the components in FIG. 4A. As such, similar reference numbers are used herein and only the differences will be described for the sake of brevity. To that end, as a non-limiting example, the runtime architecture 475 is included in a computing system such as the controller 110 shown in FIGS. 1 and 2; the electronic device 120 shown in FIGS. 1 and 3; and/or a suitable combination thereof.

As shown in FIG. 4C, the interaction handler 346 obtains (e.g., receives, retrieves, or detects) one or more user inputs 477 from the user 150 selecting a virtual agent for instantiation in a XR environment and/or associated XR content. For example, the one or more user inputs 477 correspond to voice command(s), a selection from a UI menu of virtual agents and/or associated XR content items, and/or the like. In FIG. 4C, the content selector 412 selects a virtual agent from the content library 413 based on the one or more user inputs 477. The initializer 414 selects a trained behavioral model 422B from the behavioral model library 415 that is associated with the virtual agent.

As shown in FIG. 4C, the trajectory generator 420 generates one or more behavioral trajectories 425 for the virtual agent based at least in part on the trained behavioral model 422B and a current state of a XR environment (e.g., a XR environment in which the virtual agent has been instantiated).

According to some implementations, as shown in FIG. 4C, the pose determiner 482 determines a current camera pose of the electronic device 120 and/or the user 150 relative to the virtual agent and the associated XR content. In some implementations, the renderer 484 renders the virtual agent and the associated XR content according to the current camera pose relative thereto.

According to some implementations, as shown in FIG. 4C, the image processing architecture 492 obtains an image stream from an image capture device 370 including one or more images of the physical environment 105 from the current camera pose of the electronic device 120 and/or the user 150. In some implementations, the image processing architecture 492 also performs one or more image processing operations on the image stream such as warping, color correction, gamma correction, sharpening, noise reduction, white balance, and/or the like. In some implementations, the compositor 494 composites the rendered virtual agent and the associated XR content with the processed image stream of the physical environment 105 from the image processing architecture 492 to produce rendered image frames of the XR environment. In various implementations, the presenter 344 presents the rendered image frames of the XR environment to the user 150 via the one or more display 312. One of ordinary skill in the art will appreciate that the optional image processing architecture 492 and the optional compositor 494 may not be applicable for fully virtual environments.

FIGS. 6A-6D illustrate a sequence of instances 610, 620, 630, and 640 for a virtual agent training scenario in accordance with some implementations. While certain specific features are illustrated, those skilled in the art will appreciate from the present disclosure that various other features have not been illustrated for the sake of brevity, and so as not to obscure more pertinent aspects of the implementations disclosed herein. To that end, as a non-limiting example, the sequence of instances 610, 620, 630, and 640 are rendered and presented by a computing system such as the controller 110 shown in FIGS. 1 and 2; the electronic device 120 shown in FIGS. 1 and 3; and/or a suitable combination thereof.

According to some implementations, in the sequence of instances 610, 620, 630, and 640, the user 150 controls and/or drives a virtual agent 602 within the XR environment 128 in order to train the virtual agent 602 to his/her preferences, likes, dislikes, and/or the like. Thus, for example, the manner in which the user 150 controls and/or drives the virtual agent 602 and/or his/her feedback relative thereto (e.g., positive, and/or negative feedback) corresponds to the example input data 431 in FIG. 4A.

As shown in FIGS. 6A-6D, the virtual agent training scenario includes a physical environment 105 and a XR environment 128 displayed on the display 122 of the electronic device 120. The electronic device 120 presents the XR environment 128 to the user 150 while the user 150 is physically present within the physical environment 105 that includes a table and a lamp within the FOV 111 of an exterior-facing image sensor of the electronic device 120. As such, in some implementations, the user 150 holds the electronic device 120 in his/her hand(s) similar to the operating environment 100 in FIG. 1.

In other words, in some implementations, the electronic device 120 is configured to present XR content and to enable optical see-through or video pass-through of at least a portion of the physical environment 105 on the display 122. For example, the electronic device 120 corresponds to a mobile phone, tablet, laptop, near-eye system, wearable computing device, or the like.

Figure 6A:
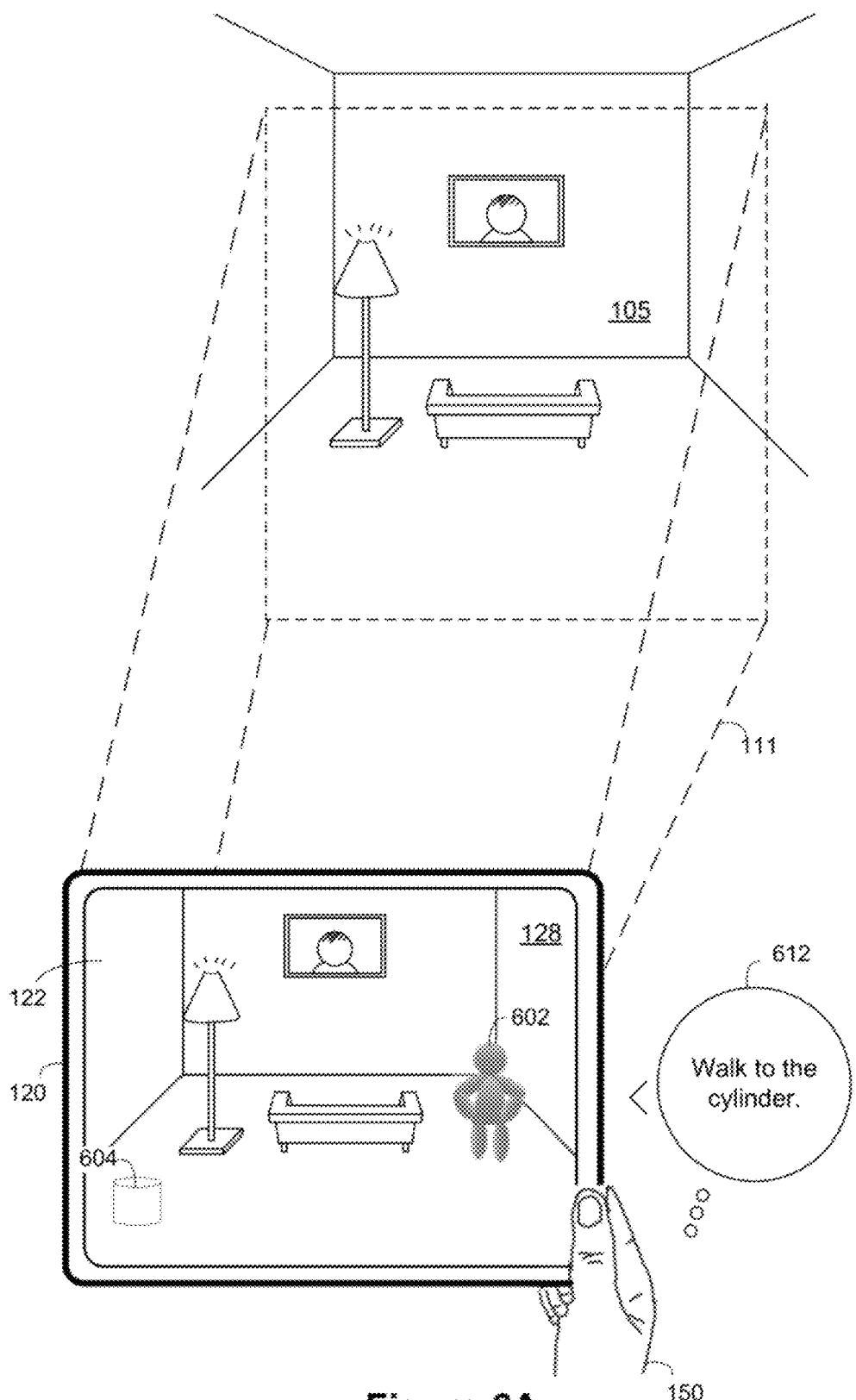
FIGS. 6A-6D illustrate a sequence of instances for an example virtual agent training scenario in accordance with some implementations.

As shown in FIG. 6A, during the instance 610 (e.g., associated with time $T_1$) of the virtual agent training scenario, the electronic device 120 presents a XR environment 128 including a virtual agent 602 and an XR cylinder 604.

In FIG. 6A, the electronic device 120 detects a voice command 612 (e.g., "Walk to the cylinder.") from the user 150 provided to control and/or drive the virtual agent 602 within the XR environment 128. In response to detecting the voice command 612 in FIG. 6A, the electronic device 120 or a component thereof (e.g., the training architecture 400 in FIG. 4A) actuates the virtual agent 602 to perform actions/tasks based on the voice command 612 and adjusts the behavioral model 422A for the virtual agent 602 based on user feedback relative thereto.

Figure 6B:
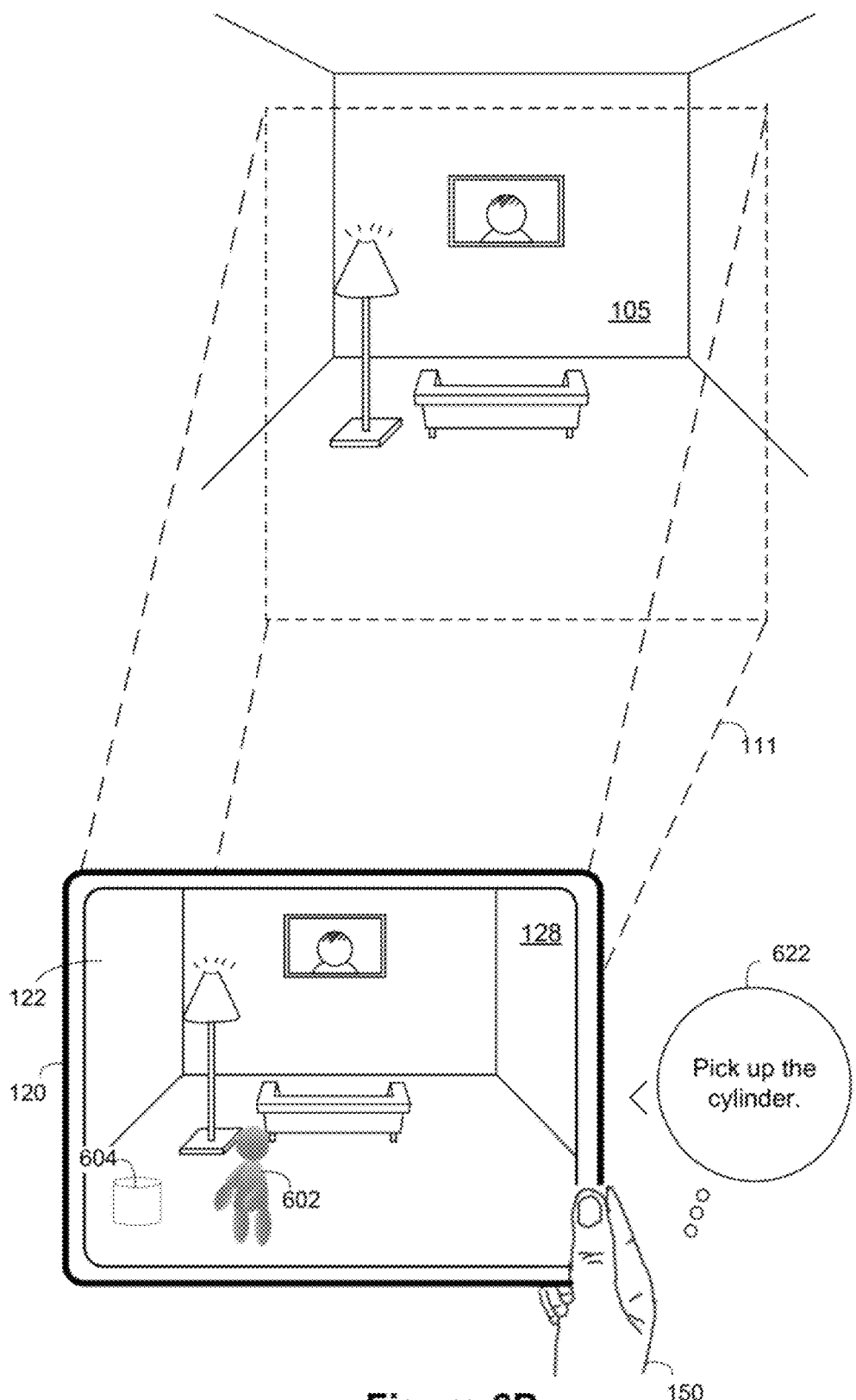

As shown in FIG. 6B, during the instance 620 (e.g., associated with time $T_2$) of the virtual agent training scenario, the electronic device 120 presents the XR environment 128 including the virtual agent 602 approaching the location of the XR cylinder 604 as compared to FIG. 6A.

In FIG. 6B, the electronic device 120 detects a voice command 622 (e.g., "Pick up the cylinder.") from the user 150 provided to control and/or drive the virtual agent 602 within the XR environment 128. In response to detecting the voice command 622 in FIG. 6B, the electronic device 120 or a component thereof (e.g., the training architecture 400 in FIG. 4A) actuates the virtual agent 602 to perform actions/tasks based on the voice command 622 and adjusts the behavioral model 422A for the virtual agent 602 based on user feedback relative thereto.

Figure 6C:
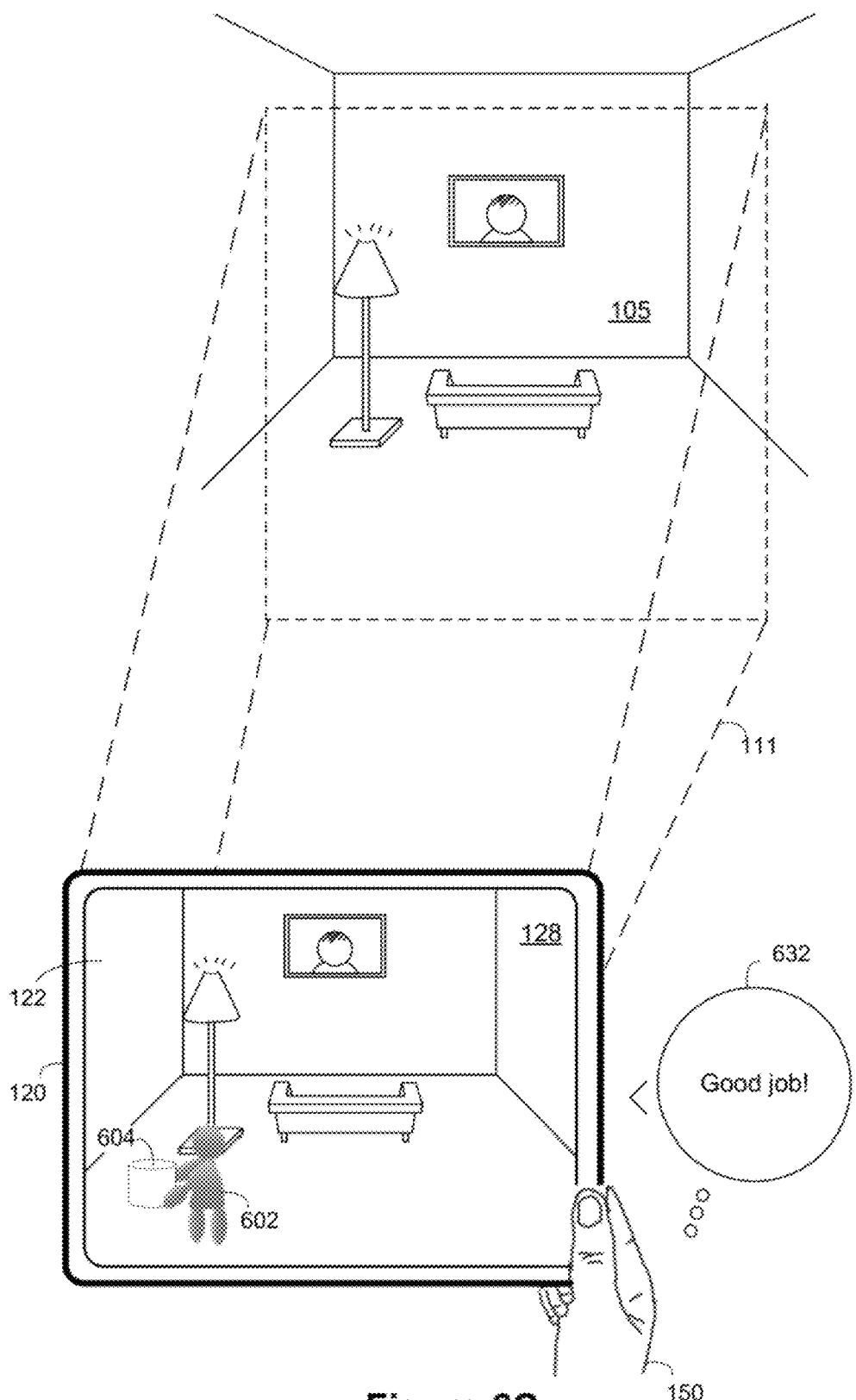

As shown in FIG. 6C, during the instance 630 (e.g., associated with time $T_{3'}$) of the virtual agent training scenario, the electronic device 120 presents the XR environment 128 including the virtual agent 602 holding the XR cylinder 604. In FIG. 6C, the electronic device 120 detects user feedback 632 (e.g., "Good job!") from the user 150 corresponds to positive user feedback. For example, positive feedback corresponds to one or more user inputs indicating that the virtual agent has satisfactorily performed action(s) in furtherance of a goal/task or has successfully completed a goal/task. In some implementations, in response to the positive user feedback 632, the training architecture 400 in FIG. 4A adjusts the behavioral model 422A to reinforce the positive user feedback 632 related to the pick-up action so as to repeat the action(s) shown in FIGS. 6B and 6C for future similar situations. In some implementations, in response to the positive user feedback 632, the training architecture 400 in FIG. 4A also adjusts the reward function so as to repeat the action(s) shown in FIGS. 6B and 6C for future similar situations.

Figure 6D:
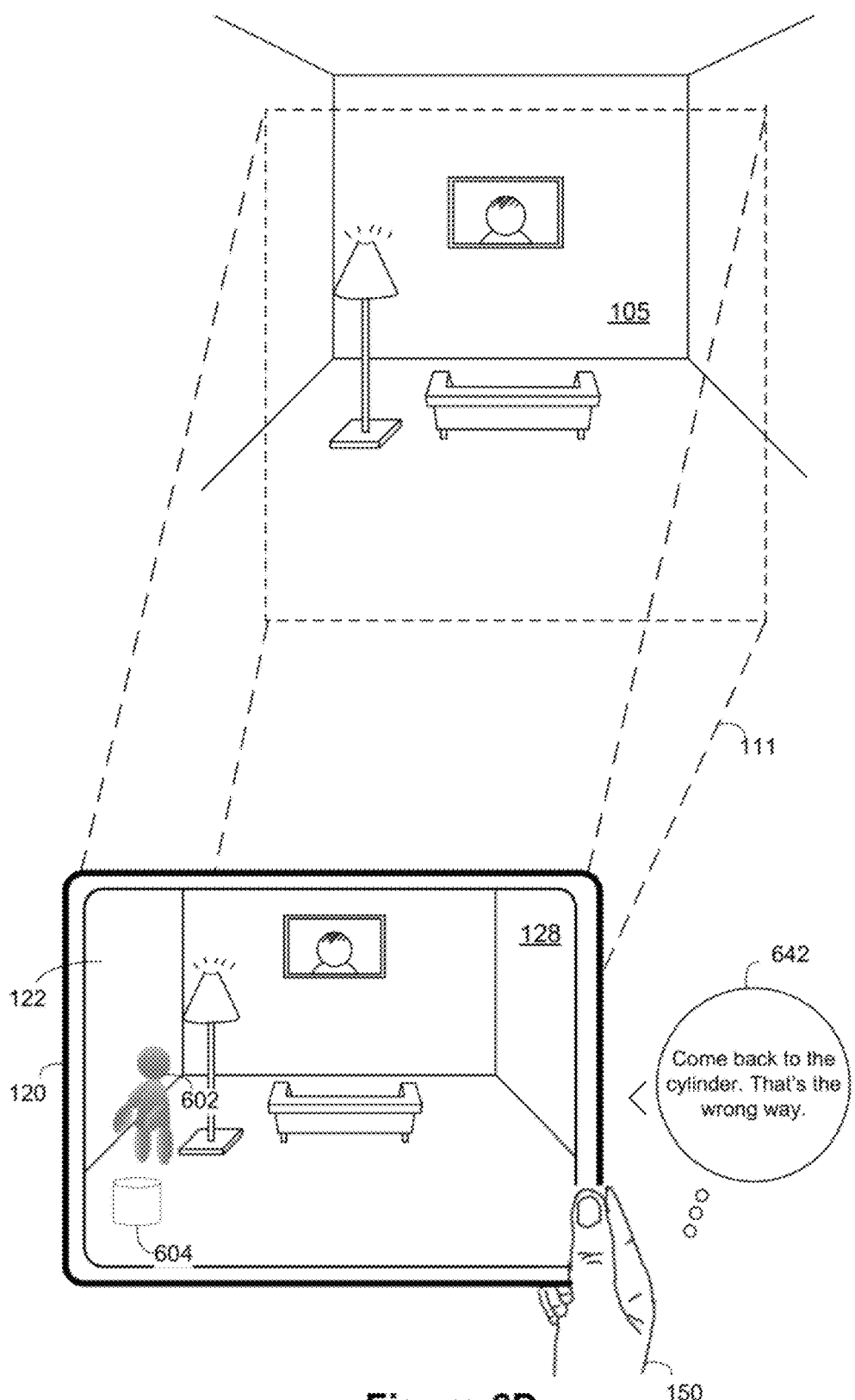

As shown in FIG. 6D, during the instance 640 (e.g., associated with time $T_{3''}$, which is an alternative version of the instance 630 in FIG. 6C associated with time $T_{3'}$) of the virtual agent training scenario, the electronic device 120 presents the XR environment 128 including the virtual agent 602 not holding the XR cylinder 604 as compared to FIG. 6C. In FIG. 6D, the electronic device 120 detects user feedback 642 (e.g., "Good job!") from the user 150 that corresponds to negative user feedback. For example, negative feedback corresponds to user inputs indicating that the virtual agent has performed action(s) that are not in furtherance of a goal/task or has not successfully completed a goal/task. In some implementations, in response to the negative user feedback 642, the training architecture 400 in FIG. 4A adjusts the behavioral model 422A to reinforce the negative user feedback 642 related to the pick-up action so as not to repeat the action(s) shown in FIGS. 6B and 6D for future similar situations. In some implementations, in response to the negative user feedback 642, the training architecture 400 in FIG. 4A also adjusts the reward function so as not to repeat the action(s) shown in FIGS. 6B and 6D for future similar situations.

FIG. 7 is a flowchart representation of a method 700 of inverse reinforcement learning (IRL) for tailoring virtual agent behaviors to a specific user in accordance with some implementations. In various implementations, the method 700 is performed at a virtual agent (VA) operating system including one or more processors and non-transitory memory (e.g., the electronic device 120 shown in FIGS. 1 and 3; the controller 110 in FIGS. 1 and 2; or a suitable combination thereof). In some implementations, the VA operating system is communicatively coupled to a display device and one or more input devices. In some implementations, the method 700 is performed by processing logic, including hardware, firmware, software, or a combination thereof. In some implementations, the method 700 is performed by a processor executing code stored in a non-transitory computer-readable medium (e.g., a memory). In some implementations, the computing system corresponds to one of a tablet, a laptop, a mobile phone, a near-eye system, a wearable computing device, or the like.

As discussed above, in some instances, a pre-authored behavior model (e.g., a PBT, decision tree, decision matrix, look-up table, or the like) may use machine learning or reinforcement learning to incorporate user preferences. However, this is a challenge without a significant corpus of example trajectories including associated user feedback. In contrast, in various implementations, IRL may be used by a virtual agent operating system to "learn" a reward function that approximates the example (or user-provided) trajectories including associated user feedback. To this end, the reward function assigns high probability values to the example (or user-provided) trajectories and also assigns lower probability values to other trajectories (i.e., maximum entropy IRL). Thereafter, the virtual agent operating system adjusts tunable parameters of the behavior model based on a reward value from the "learned" reward function. In various implementations, the virtual agent operating system adjusts tunable parameters of the behavior model using a derivative-free algorithm such as an evolutionary strategy (ES) algorithm or genetic algorithm (GA). As such, according to some implementations, method 700 perturbs tunable parameters of an initial behavior model by feeding a reward value from a "learned" reward function that employs maximum entropy IRL to approximate example (or user-provided) trajectories including associated user feedback to an ES/GA algorithm.

As represented by block 7-1, the method 700 includes obtaining an initial behavior model for a virtual agent and an initial state for a virtual environment associated with the virtual agent, wherein the initial behavior model includes one or more tunable parameters. In some implementations, the VA operating system or a component thereof (e.g., the content selector 412 in FIGS. 2, 4A, and 4B) selects a virtual agent from a content library (e.g., the content library 413 in FIGS. 2, 4A, and 4B) based on one or more user requests and/or inputs (e.g., a voice command, a selection from a UI menu of virtual agents and/or associated XR content items, and/or the like). For example, the user selects the virtual agent to be trained based on his/her preferences, likes, dislikes, and/or the like. In some implementations, the VA operating system or a component thereof (e.g., the initializer 414 in FIGS. 2, 4A, and 4B) obtains (e.g., receives, retrieves, or generates) the initial behavioral model (e.g., the untrained behavioral model 422A in FIGS. 4A and 4B) from a behavioral model library (e.g., the behavioral model library 415 in FIGS. 2, 4A, and 4B) based on the selected virtual agent.

As one example, the initial behavior model corresponds to a pre-authored behavior model. Continuing with this example, the initial behavior model corresponds to a general-purpose model from an expert author or the like. As another example, the initial behavior model corresponds to a generic, pre-existing behavioral model that is untrained. As yet another example, the initial behavior model corresponds to crowd-sourced behavioral model associated with one or more other uses that have similar preferences, likes, dislikes, demographics, etc. to the user 150.

In some implementations, the initial behavior model corresponds to one of a decision tree, a PBT, a decision matrix, or a look-up table. For example, the initial behavior model corresponds to a single task or multi-task decision tree, PBT, decision matrix, look-up table, and/or the like.

In some implementations, the virtual environment corresponds to a partially of fully XR environment. In some implementations, the initial state for the virtual environment includes contextual information associated with the virtual environment. For example, the contextual information includes a map of the virtual environment and semantically labeled objects therein. For example, the contextual information includes environmental information such as the lighting conditions, audio/acoustic conditions, or the like for the virtual environment.

As represented by block 7-2, the method 700 includes generating, based on the initial behavior model and the initial state for the virtual environment, a first set of behavioral trajectories for the virtual agent. In some implementations, the VA operating system or a component thereof (e.g., the trajectory generator 420 in FIGS. 2, 4A, and 4B) generates the first set of behavioral trajectories (e.g., the behavioral trajectories 425 in FIGS. 4A and 4B) for the virtual agent based at least in part on the initial behavioral model (e.g., the initial behavioral model 422A in FIGS. 4A and 4B) and a current state of a XR environment (e.g., a XR environment in which the virtual agent has been instantiated, a test or default XR environment, or the like). In some implementations, the first set of behavioral trajectories corresponds to a sequence of actions and/or PMP information therefor.

As represented by block 7-3, the method 700 includes obtaining a second set of behavioral trajectories from a source different from the initial behavior model. In some implementations, the VA operating system or a component thereof (e.g., the mapping/translating engine 430 in FIGS. 2, 4A, and 4B) obtains (e.g., receives, retrieves, or the like) the second set of behavioral trajectories (e.g., the example behavioral trajectories 435 in FIG. 4A) from a source different from the initial behavior model.

In some implementations, the source is one of a local source or a remote source relative to the VA operating system. For example, the second set of behavioral trajectories are obtained from a local/remote library of examples or from user inputs. In some implementations, the first and second sets of behavioral trajectories correspond to potential sequences of actions for performance by the virtual agent within the virtual environment. In some implementations, the first and second sets of behavioral trajectories correspond to a specific task. In some implementations, the first and second sets of behavioral trajectories correspond to a plurality of different tasks.

In some implementations, as represented by block 7-3a, the source corresponds to user inputs driving the virtual agent within the virtual environment. For example, in the sequence of instances 610, 620, 630, and 640 in FIGS. 6A-6D, respectively, the user 150 controls and/or drives a virtual agent 602 within the XR environment 128 in order to train the virtual agent 602 to his/her preferences, likes, dislikes, and/or the like. In some implementations, as represented by block 7-3b, the source corresponds to user feedback relative to randomized behaviors of the virtual agent within the virtual environment. In some implementations, as represented by block 7-3c, the source corresponds to pre-existing media content. For example, the pre-existing media content corresponds to a video, image, TV episode, movie, book, or other pre-authored material.

In some implementations, as represented by block 7-4, the method 700 includes normalizing the second set of behavioral trajectories based on one of a format or a modality of the first set of behavioral trajectories. In some implementations, with reference to FIG. 4A, the mapping/translating engine 430 obtains (e.g., receives, retrieves, or the like) example input data 431 from the user 150, a local source, a remote source, and/or the like. In some implementations, with continued reference to FIG. 4A, the mapping/translating engine 430 maps, translates, normalizes, etc. the example input data 431 into example behavioral trajectories 435. For example, the mapping/translating engine 430 normalizes the example input data 431 based on the modality, parameters, format, structure, etc. of the behavioral trajectories 425 generated by the trajectory generator 420.

As one example, the example input data 431 corresponds to pre-existing video content, such as movies, TV episodes, or the like, with actions/tasks for the virtual agent to emulate. As another example, the example input data 431 corresponds to actions performed by the user 150 while controlling or driving the virtual agent within the virtual environment as well as any associated user feedback relative thereto. As yet another example, the example input data 431 corresponds to actions and/or crowd-sourced behavioral trajectories for the virtual agent. As yet another example, the example input data 431 corresponds to randomly or pseudo-randomly generated actions and/or behavioral trajectories for the virtual agent as well as any associated user feedback relative thereto. As yet another example, the example input data 431 corresponds to user interactions with the virtual agent.

As such, in some implementations, the second set of behavioral trajectories are derived from pre-existing media content. In some implementations, the second set of behavioral trajectories are derived from actions performed by the user 150 while controlling or driving the virtual agent within the virtual environment. In some implementations, the second set of behavioral trajectories are derived from user feedback/preferences in relation to random or pseudo-random VA behaviors. In some implementations, the second set of behavioral trajectories are derived from a combination of user-specific interactions with the virtual agent and crowd-sourced interactions with the virtual agent.

In some implementations, the source corresponds to one or more user interactions with the virtual agent. For example, the VA operating system monitors or observes the user as he/she interacts with the virtual agent. In some implementations, both negative and positive interactions and/or feedback is used to adjust the reward function and/or behavior model. In some implementations, the source corresponds to crowd-sourced user interactions with the virtual agent. As such, for example, the VA operating system leverages the way past users have interacted with the virtual agent.

As represented by block 7-5, the method 700 includes generating an updated behavior model by adjusting at least one of the one or more tunable parameters of the initial behavior model as a function of the first and second sets of behavioral trajectories, wherein at least one of the first and second sets of behavioral trajectories are assigned different weights. For example, the one or more tunable parameters correspond to semantically meaningful parameters such as behavioral characteristics, actions, and/or the like. In some implementations, both negative and positive interactions and/or feedback is used to adjust the reward function and/or the initial behavior model.

In some implementations, generating the updated behavior model includes: adjusting a reward function by assigning greater weights to the second set of behavioral trajectories than the first set of behavioral trajectories; generating, based on the adjusted reward function, a reward value associated with the first and second sets of behavioral trajectories; and generating the updated behavior model by adjusting at least one of the one or more tunable parameters of the initial behavior model based on the reward value. According to various implementations, with reference to FIG. 4A, the reward estimator 440 weights the example behavioral trajectories 435 greater than the behavioral trajectories 425. In some implementations, adjusting the reward function includes using a maximum entropy inverse reinforcement learning technique. As such, in some implementations, the behavior model is perturbed or adjusted by a genetic or evolutional algorithm as opposed to a neural network.

In some implementations, with reference to FIG. 4A, the VA operating system or a component thereof (e.g., the reward estimator 440 in FIG. 4A) generates one or more reward signals 445 based on: (A) the behavioral trajectories 435; and (B) the example behavioral trajectories 435. In some implementations, prior to subjecting the aforementioned trajectories to a reward function, the reward function adjustor 442 sets weights for the behavioral trajectories 435 and the example behavioral trajectories 435 based on user feedback (e.g., positive, and/or negative feedback) relative thereto. According to various implementations, the example behavioral trajectories 435 may be weighted greater than the behavioral trajectories 425.

In some implementations, with reference to FIG. 4A, the VA operating system or a component thereof (e.g., the ES/GA manager 424 in FIGS. 4A and 4B) adjusts at least some of the one or more tunable parameters of the behavioral model 422A based on the one or more reward signals 445 from the reward estimator 440. According to some implementations, the ES/GA manager 424 corresponds to a derivative-free algorithm. As such, for example, the ES/GA manager 424 adapts the behavioral model 422A to the preferences, likes, dislikes, and/or the like of the user 150. The ES/GA manager 424 is described in more detail above with respect to FIG. 4B. One of ordinary skill in the art will appreciate that the ES/GA manager 424 may be replaced with various other algorithms and/or techniques that perturb the one or more tunable parameters of the behavioral model 422A such as a neural network, DNN, CNN, SVM, RVM, random forest algorithm, or the like.

In some implementations, the method 700 includes: generating, based on the updated behavior model, a third set of behavioral trajectories; instantiating the virtual agent within the virtual environment; and presenting the virtual agent performing one or more actions within the virtual environment that correspond to at least some of the third set of behavioral trajectories. For example, the virtual environment may be partially and/or fully XR.

According to some implementations, with reference to the runtime architecture 475 in FIG. 4C, the VA operating system or a component thereof (e.g., the pose determiner 482 in FIGS. 2 and 4C) determines a current camera pose of the electronic device 120 and/or the user 150 relative to the virtual agent. Thereafter, the VA operating system or a component thereof (e.g., the renderer 484 in FIGS. 2 and 4C) renders the virtual agent performing the one or more actions within the virtual environment that correspond to at least some of the third set of behavioral trajectories according to the current camera pose relative thereto.

When the virtual environment is partially virtual (e.g., a video pass-through scenario), with reference to the runtime architecture 475 in FIG. 4C, the VA operating system or a component thereof (e.g., the image processing architecture 492 in FIGS. 2 and 4C) obtains (e.g., receives, retrieves, or captures) an image stream including one or more images of the physical environment 105 from the current camera pose of the electronic device 120 and/or the user 150. When the virtual environment is partially virtual (e.g., a video pass-through scenario), with continued reference to the runtime architecture 475 in FIG. 4C, the VA operating system or a component thereof (e.g., the compositor 494 in FIGS. 2 and 4C) renders the virtual agent and associated XR content with the processed image stream of the physical environment 105 from the image processing architecture 492 to produce rendered image frames of the XR environment for display. One of ordinary skill in the art will appreciate that the optional image processing architecture 492 and the optional compositor 494 may not be applicable for fully virtual environments.

In some implementations, presenting the virtual agent performing the one or more actions within the virtual environment includes projecting the virtual agent performing one or more actions within the virtual environment onto a transparent lens assembly. In some implementations, presenting the virtual agent performing the one or more actions within the virtual environment includes compositing the virtual agent performing one or more actions with one or more images of a physical environment captured by an exterior-facing image sensor.

While various aspects of implementations within the scope of the appended claims are described above, it should be apparent that the various features of implementations described above may be embodied in a wide variety of forms and that any specific structure and/or function described above is merely illustrative. Based on the present disclosure one skilled in the art should appreciate that an aspect described herein may be implemented independently of any other aspects and that two or more of these aspects may be combined in various ways. For example, an apparatus may be implemented and/or a method may be practiced using any number of the aspects set forth herein. In addition, such an apparatus may be implemented and/or such a method may be practiced using other structure and/or functionality in addition to or other than one or more of the aspects set forth herein.

It will also be understood that, although the terms "first", "second", etc. may be used herein to describe various elements, these elements should not be limited by these terms. These terms are only used to distinguish one element from another. For example, a first media item could be termed a second media item, and, similarly, a second media item could be termed a first media item, which changing the meaning of the description, so long as the occurrences of the "first media item" are renamed consistently and the occurrences of the "second media item" are renamed consistently. The first media item and the second media item are both media items, but they are not the same media item.

The terminology used herein is for the purpose of describing particular implementations only and is not intended to be limiting of the claims. As used in the description of the implementations and the appended claims, the singular forms "a", "an", and "the" are intended to include the plural forms as well, unless the context clearly indicates otherwise. It will also be understood that the term "and/or" as used herein refers to and encompasses any and all possible combinations of one or more of the associated listed items. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" may be construed to mean "when" or "upon" or "in response to determining" or "in accordance with a determination" or "in response to detecting," that a stated condition precedent is true, depending on the context. Similarly, the phrase "if it is determined [that a stated condition precedent is true]" or "if [a stated condition precedent is true]" or "when [a stated condition precedent is true]" may be construed to mean "upon determining" or "in response to determining" or "in accordance with a determination" or "upon detecting" or "in response to detecting" that the stated condition precedent is true, depending on the context.

What is claimed is:

1. A method comprising:
at a virtual agent operating system including one or more processors and non-transitory memory:
obtaining an initial behavior model for a virtual agent and an initial state for a virtual environment associated with the virtual agent, wherein the initial behavior model includes one or more tunable parameters;
generating, based on the initial behavior model and the initial state for the virtual environment, a first set of behavioral trajectories for the virtual agent;
obtaining a second set of behavioral trajectories from a source different from the initial behavior model, wherein the source corresponds to one or more user inputs driving the virtual agent within the virtual environment or user feedback relative to randomized behaviors of the virtual agent within the virtual environment; and
generating an updated behavior model by adjusting at least one of the one or more tunable parameters of the initial behavior model as a function of the first and second sets of behavioral trajectories, wherein at least one of the first and second sets of behavioral trajectories are assigned different weights.

2. The method of claim 1, wherein the first and second sets of behavioral trajectories correspond to potential sequences of actions for performance by the virtual agent within the virtual environment.

3. The method of claim 1, wherein the initial state for the virtual environment includes contextual information associated with the virtual environment.

4. The method of claim 1, further comprising:
normalizing the second set of behavioral trajectories based on one of a format or a modality of the first set of behavioral trajectories.

5. The method of claim 1, wherein generating the updated behavior model includes:
adjusting a reward function by assigning greater weights to the second set of behavioral trajectories than the first set of behavioral trajectories;
generating, based on the adjusted reward function, a reward value associated with the first and second sets of behavioral trajectories; and
generating the updated behavior model by adjusting at least one of the one or more tunable parameters of the initial behavior model based on the reward value.

6. The method of claim 5, wherein adjusting the reward function includes using a maximum entropy inverse reinforcement learning (IRL) technique.

7. The method of claim 1, further comprising:
generating, based on the updated behavior model, a third set of behavioral trajectories;
instantiating the virtual agent within the virtual environment; and
presenting the virtual agent performing one or more actions within the virtual environment that correspond to at least some of the third set of behavioral trajectories.

8. The method of claim 7, wherein presenting the virtual agent performing the one or more actions within the virtual environment includes projecting the virtual agent performing one or more actions within the virtual environment onto a transparent lens assembly.

9. The method of claim 7, wherein presenting the virtual agent performing the one or more actions within the virtual environment includes compositing the virtual agent performing one or more actions with one or more images of a physical environment captured by an exterior-facing image sensor.

10. The method of claim 1, wherein the source further corresponds to pre-existing media content.

11. The method of claim 1, wherein the source is one of a local source or a remote source relative to the virtual agent operating system.

12. The method of claim 1, wherein the initial behavior model corresponds to a pre-authored behavior model.

13. The method of claim 1, wherein the initial behavior model corresponds to one of a decision tree, a probabilistic behavior tree (PBT), a decision matrix, or a look-up table.

14. The method of claim 1, wherein the first and second sets of behavioral trajectories correspond to a specific task.

15. The method of claim 1, wherein the first and second sets of behavioral trajectories correspond to a plurality of different tasks.

16. A device comprising:
one or more processors;
a non-transitory memory;
an interface for communicating with a display device and one or more input devices; and
one or more programs stored in the non-transitory memory, which, when executed by the one or more processors, cause the device to:
obtain an initial behavior model for a virtual agent and an initial state for a virtual environment associated with the virtual agent, wherein the initial behavior model includes one or more tunable parameters;
generate, based on the initial behavior model and the initial state for the virtual environment, a first set of behavioral trajectories for the virtual agent;
obtain a second set of behavioral trajectories from a source different from the initial behavior model, wherein the source corresponds to one or more user inputs driving the virtual agent within the virtual environment or user feedback relative to randomized behaviors of the virtual agent within the virtual environment; and
generate an updated behavior model by adjusting at least one of the one or more tunable parameters of the initial behavior model as a function of the first and second sets of behavioral trajectories, wherein at least one of the first and second sets of behavioral trajectories are assigned different weights.

17. The device of claim 16, wherein the first and second sets of behavioral trajectories correspond to potential sequences of actions for performance by the virtual agent within the virtual environment.

18. The device of claim 16, wherein the initial state for the virtual environment includes contextual information associated with the virtual environment.

19. The device of claim 16, wherein the one or more programs further cause the device to:
normalize the second set of behavioral trajectories based on one of a format or a modality of the first set of behavioral trajectories.

20. The device of claim 16, wherein generating the updated behavior model includes:
adjusting a reward function by assigning greater weights to the second set of behavioral trajectories than the first set of behavioral trajectories;
generating, based on the adjusted reward function, a reward value associated with the first and second sets of behavioral trajectories; and
generating the updated behavior model by adjusting at least one of the one or more tunable parameters of the initial behavior model based on the reward value.

21. A non-transitory memory storing one or more programs, which, when executed by one or more processors of a device with an interface for communicating with a display device and one or more input devices, cause the device to:
obtain an initial behavior model for a virtual agent and an initial state for a virtual environment associated with the virtual agent, wherein the initial behavior model includes one or more tunable parameters;
generate, based on the initial behavior model and the initial state for the virtual environment, a first set of behavioral trajectories for the virtual agent;
obtain a second set of behavioral trajectories from a source different from the initial behavior model; and
generate an updated behavior model by adjusting at least one of the one or more tunable parameters of the initial behavior model as a function of the first and second sets of behavioral trajectories, wherein at least one of the first and second sets of behavioral trajectories are assigned different weights based at least in part on using an inverse reinforcement learning (IRL) technique.

22. The non-transitory memory of claim 21, wherein the first and second sets of behavioral trajectories correspond to potential sequences of actions for performance by the virtual agent within the virtual environment.

23. The non-transitory memory of claim 21, wherein the initial state for the virtual environment includes contextual information associated with the virtual environment.

24. The non-transitory memory of claim 21, wherein the one or more programs further cause the device to:
normalize the second set of behavioral trajectories based on one of a format or a modality of the first set of behavioral trajectories.

25. The non-transitory memory of claim 21, wherein generating the updated behavior model includes:
adjusting a reward function by assigning greater weights to the second set of behavioral trajectories than the first set of behavioral trajectories;
generating, based on the adjusted reward function, a reward value associated with the first and second sets of behavioral trajectories; and
generating the updated behavior model by adjusting at least one of the one or more tunable parameters of the initial behavior model based on the reward value.

* * * * *